United States Patent [19]

Nigawara et al.

[11] Patent Number: 5,353,400
[45] Date of Patent: Oct. 4, 1994

[54] CONTROL SYSTEM FOR AN INDUSTRIAL PLANT, A DISPLAY DEVICE FOR SUCH A CONTROL SYSTEM, AND A METHOD OF CONTROLLING AN INDUSTRIAL PLANT

[75] Inventors: Seiitsu Nigawara; Masayuki Fukai; Masashi Sugihara; Kazuo Furudate, all of Hitachi; Hashime Nagai, Kitaibaraki, all of Japan

[73] Assignee: Hitachi, Ltd., Tokyo, Japan

[21] Appl. No.: 495,909

[22] Filed: Mar. 20, 1990

[30] Foreign Application Priority Data

Mar. 20, 1989 [JP] Japan ................................. 1-66227

[51] Int. Cl.$^5$ ............................................. G06F 15/62
[52] U.S. Cl. .................................................. 395/161
[58] Field of Search ............... 395/155, 156, 158, 160, 395/161; 364/146, 149, 150, 151, 152, 188, 190, 192, 193

[56] References Cited

U.S. PATENT DOCUMENTS

| | | | |
|---|---|---|---|
| 4,823,283 | 4/1989 | Diehm et al. | 364/146 X |
| 4,943,906 | 7/1990 | Tajima et al. | 364/188 |
| 4,967,381 | 10/1990 | Lane et al. | 364/551.01 |
| 5,005,116 | 4/1991 | Fujita et al. | 364/188 |
| 5,006,976 | 4/1991 | Junot | 364/184 |
| 5,043,904 | 8/1991 | Sikes et al. | 364/188 X |
| 5,101,197 | 3/1992 | Hix et al. | 340/784 |

*Primary Examiner*—Heather R. Herndon
*Attorney, Agent, or Firm*—Antonelli, Terry, Stout & Kraus

[57] ABSTRACT

A control system for an industrial plant receives plant data and combines that plant data with a plurality of graphical patterns representing the plant. In this way a series of prepared displays are created to be displayed fox a user of the control system. If the user wants to simplify one or more of the displays, in order to make it more clear, the control system has means for modifying the displays, and displaying that modified display. The modification may be one of a number of possibilities such as deletion (masking) part or all of the display. In this way, the full plant information may be presented, or more limited information may be presented, e.g. to a more experienced user.

25 Claims, 23 Drawing Sheets

FIG. 19

DISPLAY PRIORITY ORDER 1
2
3

| ×××× . × | T/H |
| ××× . × | ATG |
| ××× . × | °C |

↓

| //////////// | ← MASKING PROCESSING |
| ××× . × ATG | |
| //////////// | ← MASKING PROCESSING |

↓

| ××× . × ATG | SHIFTING TO BLANK DISPLAY AREA WITH HIGHER PRIORITY |
| | |
| //////////// | |

← FLICKERING PROCESSING OF MASK

FIG. 23
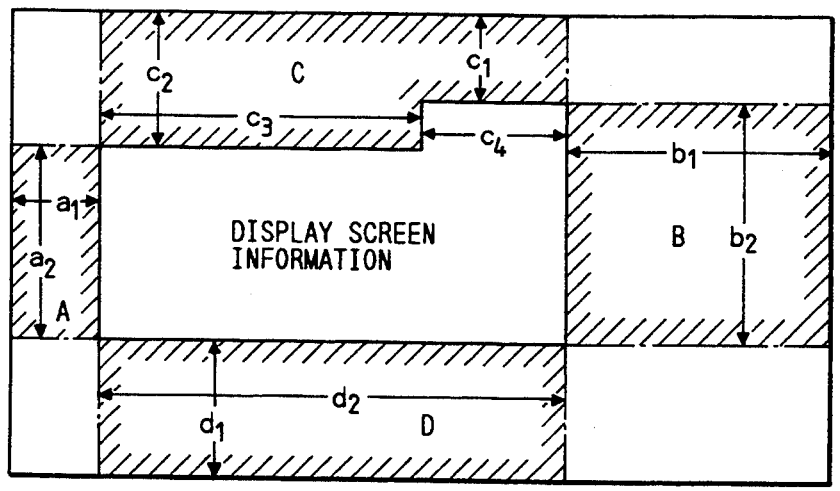
(a)
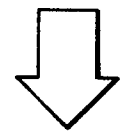
(b) BALANCE ADJUSTMENT PROCESSING OF DISPLAY SCREEN
TO OBTAIN SUCH VALUES $a_1$, $d_1$ THAT HATCHED PART AREAS A, B, C, D BECOME AS UNIFORM AS POSSIBLE.
(TO DISPLAY "DISPLAY SCREEN INFORMATION" AT THE BEST BALANCED POSITION.)
---
$A \fallingdotseq B \fallingdotseq C \fallingdotseq D$, WHEREIN
$A = a_1 \cdot a_2$, $B = b_1 \cdot b_2$, $C = c_1 \cdot c_4 + c_2 \cdot c_3$, $D = d_1 \cdot d_2$
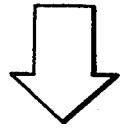
(c)

CONTROL SYSTEM FOR AN INDUSTRIAL PLANT, A DISPLAY DEVICE FOR SUCH A CONTROL SYSTEM, AND A METHOD OF CONTROLLING AN INDUSTRIAL PLANT

BACKGROUND OF THE INVENTION

1. Field of the Invention

The present invention relates to a control system for an industrial plant. Such control systems have one or more display devices for displaying information relating to the plant, and the present invention is particularly concerned with such display devices. The present invention also relates to a method of controlling an industrial plant.

2. Description of the prior art

Most complex industrial plants have at least one control with displays for displaying information about the operation of the plant, to enable an operator (the user of the control) to monitor the performance of the plant. It is frequently the case that a single display (such as a CRT, VDU, or large-size screen) is arranged to display several different bits of information, corresponding to different parts of the plant, for example, in practice, the control system stores one or more patterns representing the plant, which forms the basis of the display. Those patterns are made of a plurality of pattern elements, such as symbols representing pumps, valves, and lights for interconnecting them so that the pattern represents the plant. Furthermore, the control system receives plant data representing operating conditions of the plant, such as temperature or pressure at particular points, whether valves are open or closed, whether a pump is running or not, etc. The plant data is then combined with the patterns in a way which is preset, to form one or more prepared displays. The operator may then select one of those prepared displays, and display it when needed, or the apparatus may be arranged to display sequentially all those prepared displays.

At its simplest, the designer of the control system determines which plant data is to be displayed with a given pattern, so that the prepared patterns are entirely preset, and there is only one prepared display corresponding to each pattern.

However, such a system has a disadvantage. If the operator of the system is relatively inexperienced, it is often helpful for the display to display all the plant data relating to the part of the plant corresponding to a given pattern. Furthermore, explanatory information can also be displayed. The display then becomes complicated because the relative inexperience of the operator requires that complex information.

However, if the operator is already experienced, or an inexperienced operator learns more about the system, it then becomes less important for some of the plant data to be displayed. Then, the very complexity of the display tends to reduce the efficiency of the operator, because there is the risk of the operator becoming confused by the volume of information that is displayed. It is preferable, then for a simpler display to be provided, in which only that information which is actually necessary or desired by the operator is displayed.

Japanese patent application laid-open 55-157009 seeks to solve this problem. It proposes that more than one prepared display is provided for a given pattern (e.g. corresponding to a particular part of the plant). Then, one of those prepared displays may be relatively complete, for an inexperienced user, and another may be more simple for an experienced user. The operator then can switch between one prepared pattern and another, depending on his level of experience.

Furthermore, Japanese patent application laid-open number 55-157009 also suggests that, for a given pattern, several prepared displays may be provided, each displaying different conditions, e.g. one displaying temperature conditions corresponding to the pattern, another displaying pressure conditions corresponding to the pattern, etc., so that the operator may select a particular group of plant data for observation.

In Japanese patent application laid-open number 55-157009, however, every display that is to be displayed has a corresponding prepared display, i.e. a different prepared display is needed for each particular manner of presentation. Thus, it may be desired to have one display of a particular pattern showing a large amount of information, and this will need one prepared display, and a the further prepared display will be needed if that pattern is to be displayed with a more limited amount of information. The number of prepared displays is therefore large. Since a large amount of programming work (up to 3 days) may be required to produce each prepared display, the total amount of work is therefore large. Furthermore, a large memory is needed to store all the prepared displays.

SUMMARY OF THE INVENTION

According to the present invention, it is proposed that means be provided for modifying a given prepared display prior to its display by the display device of the control system. With such an arrangement, the number of prepared displays is reduced because, if a display is wanted for a given pattern and a large amount of data, and another display is wanted for the same pattern and a more limited amount of data, then the prepared display may correspond to the former, and that prepared display is then modified to produce the latter. The modification of the prepared display may be one or more of a large range of possible modifications, which may be selected by the user or may be selected automatically. These modifications will be discussed in more detail later, but may be grouped into a number of different types:

1) Deletion: modification may involve the deletion from the display of some of the plant data associated with a given pattern, so that only the necessary or desired data is displayed. This may be, for example, to simplify the display for an experienced user, or to collect a particular type of data (e.g. temperature, pressure, etc.) for display. This type of modification will be referred to subsequently as masking.

2. Change of intensity: rather than completely deleting plant data from the display, it is also possible for unnecessary or non-useful information to be reduced intensity on the display, so that the more important plant data is more prominent.

3. Translation: a further possible modification is to move some or all of the plant data, or even the whole of the pattern, on the display screen. There are two situations where this is important. Firstly, suppose several parameters are associated with e.g. a pattern element in the prepared pattern. Suppose then that e.g. by deletion, some of those data are not displayed. Then, the displayed data may be spaced by a significant amount from the corresponding pattern element. Then, the modification may involve translation of that plant data to a position closer to the pattern element with which it is associated. A further alternative arises when the deleted data is extensive, so that a substantial part of the display is blank. Then, it is preferable for the whole of the remaining part of the display including the pattern to be shifted so that it is approximately central in the display screen.

4. Change of colour: rather than mask or reduce an intensity of unwanted data, it is possible for unimportant data to be displayed a different colour, so that the important data may readily be distinguished. Further alternatives within this type of modification include reverse colouring, in which the background and the data colours are reversed so that they are more readily visible.

5. Magnification: important data may be emphasised by making it appear larger on the display, although the display may be changed in size.

6. Periodic changes: as described above, all the modifications are static. However, it is also possible for e.g. important information to be flashed, so that it is more readily visible, by periodically carrying out some or all of the modifications discussed above, so that emphasis is given to the important information.

In a further development of the present invention, additional information may also be presented. For example, some plant data e.g. enthalpy is obtained by a calculation from other plant data. Then, the operator may choose whether that enthalpy data is displayed or not, and this may also be considered a modification of the prepared display. Yet another possibility is for additional indicators to be provided on the display, such as pointers to particularly important parts of the display.

It is preferable for the control system of the present invention to have a printer for providing a hard-copy print-out of the display. Such a hard-copy print-out may be triggered by the operator, or may be triggered automatically, e.g. when there is a malfunction of the plant. The hard-copy print-out may be of the modified display as actually presented on the display means, or may be the prepared display with all the information concerning the operation as planned.

It is also possible for more than one display to be presented simultaneously on a display screen, and each display may then be a modified prepared display.

As was mentioned above the present invention relates not only to a control system for the plant, but also relates to a method of operating such a control system, and to a display device and display method for such a control system.

BRIEF DESCRIPTION OF THE DRAWINGS

Embodiments of the present invention will now be described in detail, by way of example, with reference to the accompanying drawings in which:

FIGS. 10 to 25 illustrate displays which may be produced by the control system of the present invention.

DETAILED DESCRIPTION

In the following description, the following terminology should be noted. As mentioned above, plant data representing operating parameters of the plant (therefore variable) is combined with a graphical pattern representing the plant (which is fixed and will be referred to as fixed form information) to form a prepared display. That prepared display may be displayed on a suitable display device (CAT, VDU, etc.) or may be modified to form a modified display, before being displayed on the display device. For the sake of clarity, a display formed by that combination of a graphical pattern and plant data will be hereinafter referred to as a "screen", this term applying both to modified and unmodified displays. Since the word "screen" is used for the information displayed, the component on which that "screen" is displayed will be referred to as a display device.

Figure 1:
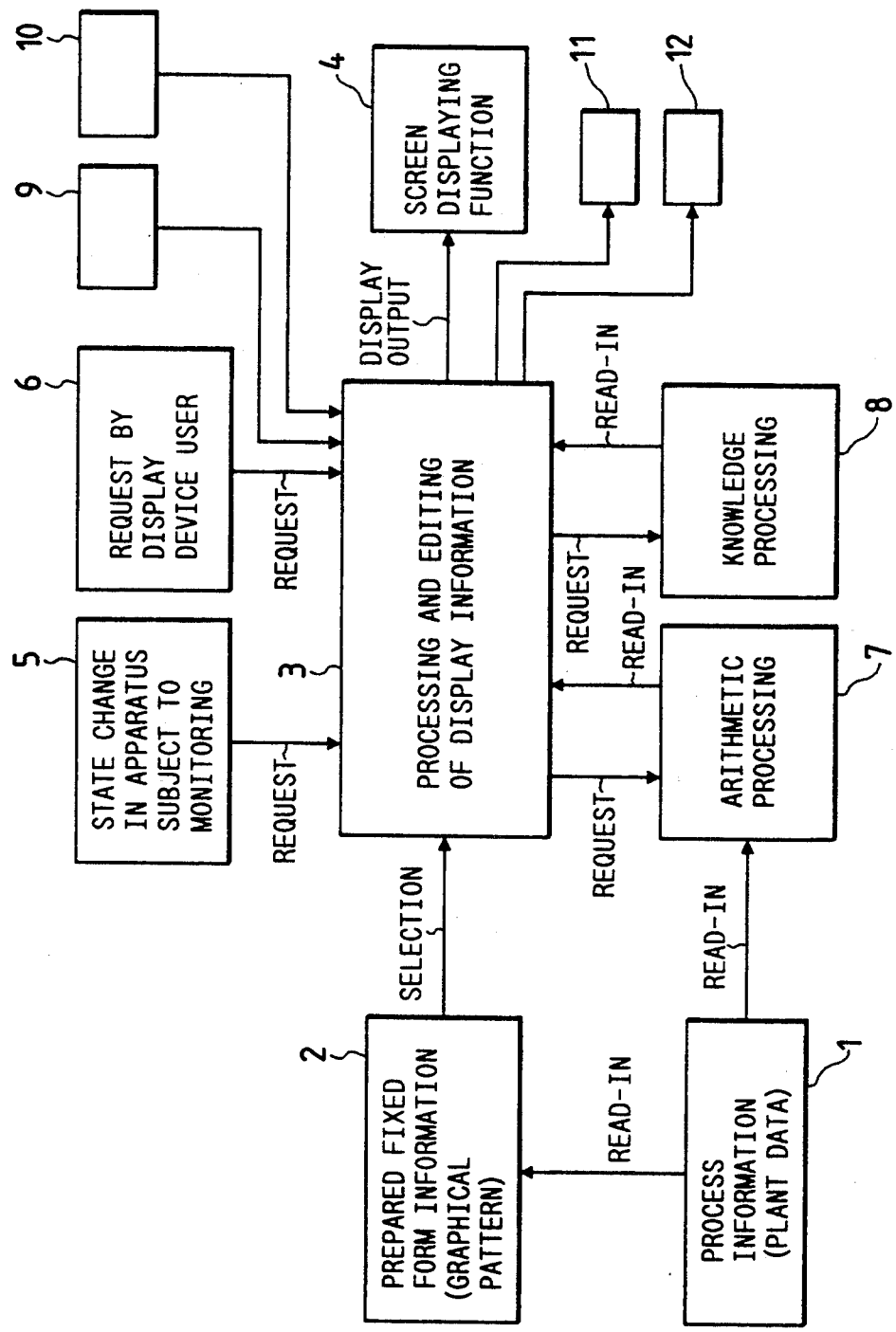
FIG. 1 shows a block diagram of a control system according to the present invention.

FIG. 1 shows a block diagram representing, in functional terms, an embodiment of the present invention, being a control system for an industrial plant. Plant parameters, such as temperature, pressure, flow rate, operational states of components of the plant, etc., may be detected by suitable means (not shown) and input to the control system. The control system then has a component 1 which converts those plant parameters to plant data, i.e. information representing the process being carried on by the plant. That processed information is transmitted to component 2 in which it is combined with a corresponding graphical pattern, i.e. information pre-prepared in fixed form. The combined process information and fixed form information produce a plurality of prepared displays, and one or more of those prepared displays is then selected and transmitted to a component 3 which carries out modification of that prepared display, and the modified display may then be displayed by a suitable display device 4, and may also be copied onto a hard-copy print-out by means of a display screen copying component 11. A selection of the screen information to be processed and displayed may be printed out automatically in accordance with changes in the state of the components of the plant which are being monitored, e.g. such changes in the components subject to monitoring such as "operational phases or start-up or shut-down", "operating situations (running), stopping, etc." "non-normal state" and the like, or in accordance with a request 6 activated by the user of the display device. Such a request may include a request for a classified display of the display processors, a request for a classified display of steam systems, water systems, etc. a request for the display of the computer value of states of the process, such as enthalpy, entropy, etc., a request for display of a pre-estimated value of a pre-estimated trend of a process being carried on by the plant, a request for the display the deviation of a parameter from a normal value or a standard value, a request for a display of the deviation of a plant parameter from safety conditions, a request for a display of the deviation in a plant parameter during a change, etc.

The information displayed on the display device may include plant data which is computed by an arithmetic process function component 7 only when requested. Such plant data may include enthalpy, entropy, etc., furthermore, if unnecessary pieces of information are excluded from the modified display to be displayed on the display device 4, the display may become unbalanced, and this may be detected by a knowledge processing function component 8 which causes the parts of the display to be moved on the display device screen, so that the modified display is balanced.

Of course, presentation of any particular display on the display device 4 is unnecessary if the operator is not present. Therefore, means 9 may be provided for detecting the presence of the operator. Also, since the operator must be taking note of the displays presented on the display screen, a display information function device 12 may be provided showing that a particular display has been automatically displayed. In the case of an automatic display, it is then possible to provide automatic deletion of the displayed display after a predetermined time limit.

As was mentioned above, one reason for modification of a prepared display is the amount of experience posessed by operator. Therefore, the system may have a device 10 for indicating to the rest of the control system the skill level of the operator. For example the device 10 may receive an ID card identifying the operator, and the amount of plant data to be displayed may be determined in accordance with the skill of the operator.

Various operations for modifying the prepared displays have been mentioned above. The most important is the process and editing function carried out by component 3, and the effect of this function on a screen displayed by a display device of the control system will now be described.

Figure 2:
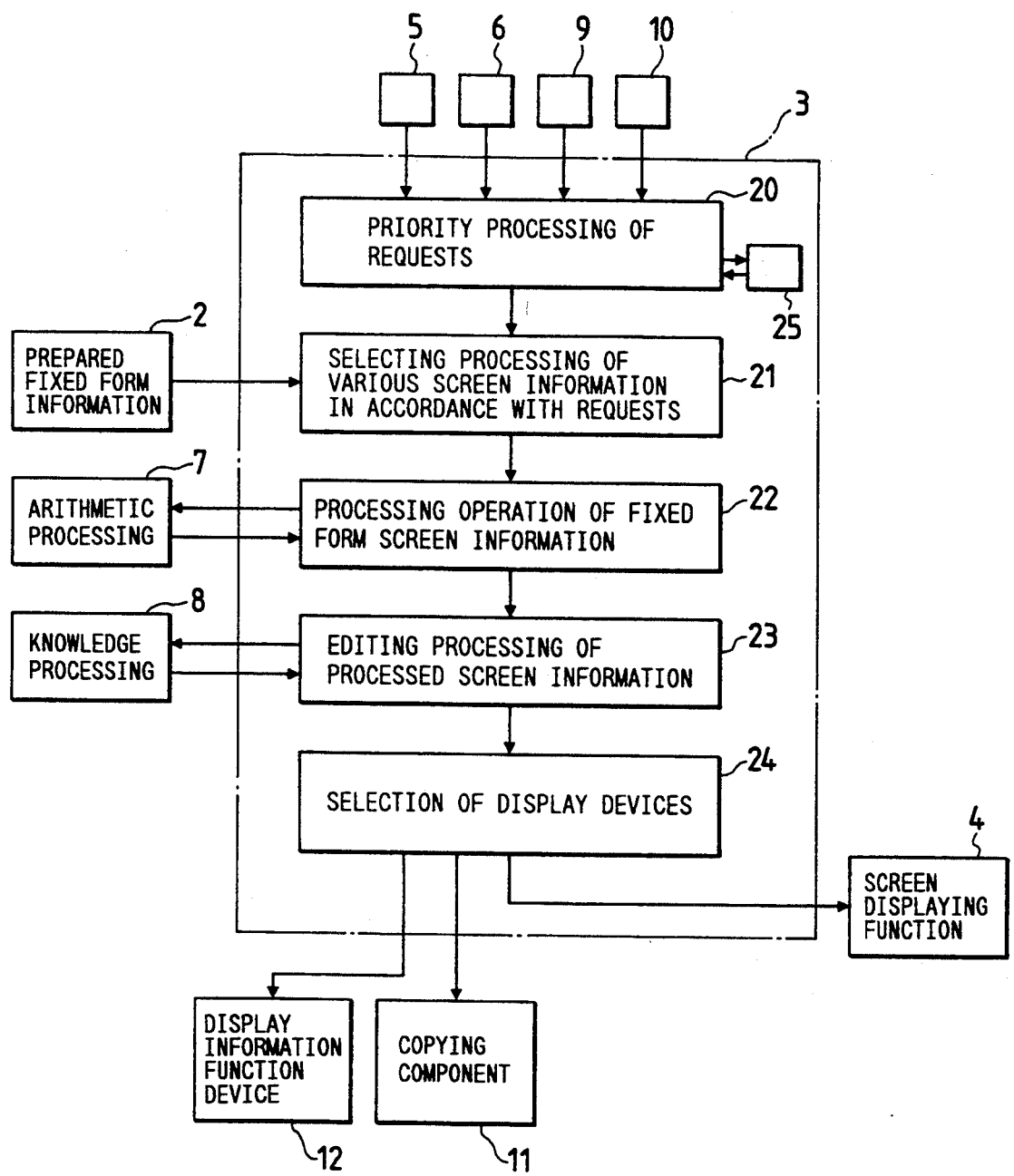
FIG. 2 is a block diagram illustrating in more detail part of the control system of FIG. 1.

FIG. 2 is a diagram representing the functional steps of the processing and editing function carried out by the components on information presented in a screen. The various information for a screen fed to the processing component 3 by the components 5, 6, 9 and 10 shown in FIG. 1 are ordered into a priority order on the basis of priority processing request 20, and that priority is stored in a priority order memory 25. That stored priority order determines the order of selection 21 of information from the plurality of text form information (i.e. graphical patterns representing the plan) stored in component 2, and then that information is subject to a process operation 22 and an editing operation 23. If the control system has a plurality of display devices for displaying process and editing screens, an appropriate display device is selected by a display device selection step 24, and display of the appropriate screen is carried out. The operation of the display device is generated so that the user of the display device can take note of the screen displayed when that screen is displayed automatically. Moreover, the device 11 for copying a screen onto hard-copy may be provided, and may carry out the following operations: (1) On the basis of information excluded from the screen by masking or similar operations can also be printed on the hard-copy. It can be seen that the most important feature of the screen as displayed on the display device is visual clarity, whereas the total amount of information may be more important on a hard-copy. (2) It is possible for such printing to occur not only at the request of the operator, who signals via component 6, but also when there is a change in state in the plant being controlled, which may be signalled via component 5. For example, if an accident occurs in the plant, the component 5 may request that a screen including information about the plant to be copied automatically.

Figure 26:
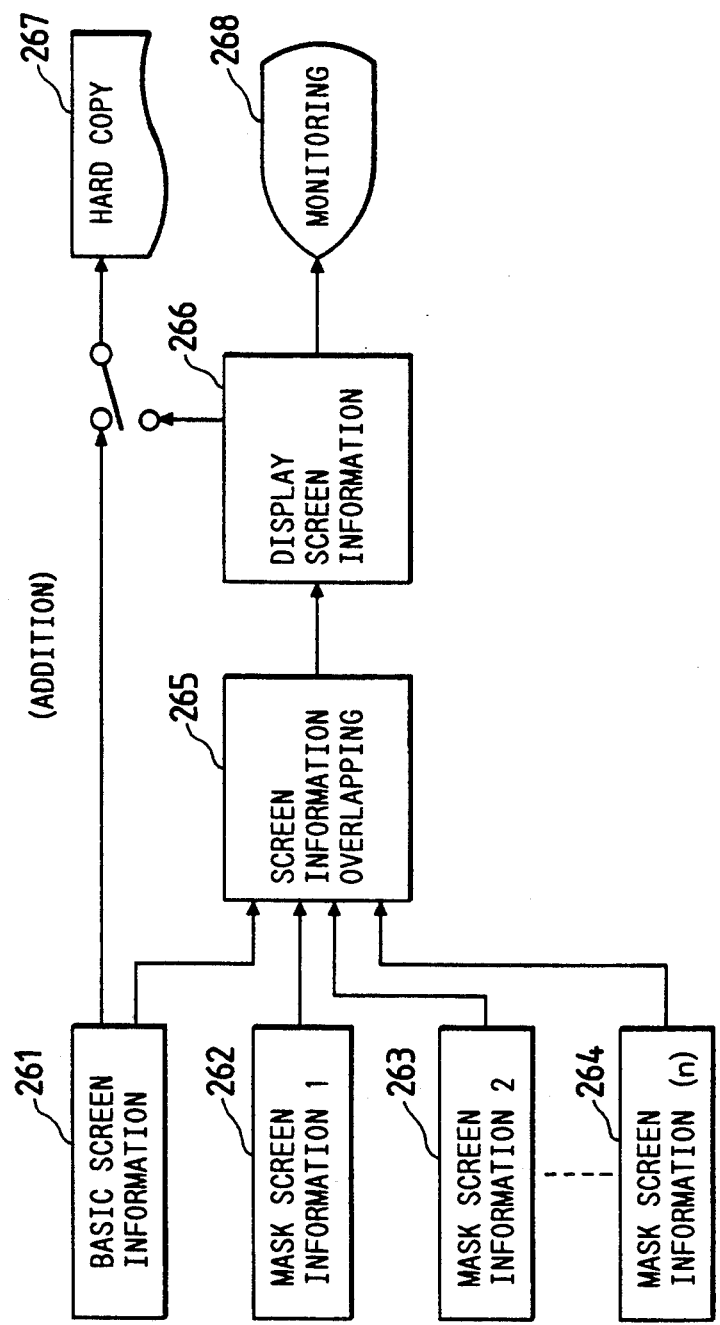
FIG. 26 shows a block diagram of part of an embodiment of a control system having means for providing a hard-copy print-out of a display.

Referring now to FIG. 26, a prepared display (basic screen) at a functional block 261 is combined with one or more items of mask screen information from functional blocks 262, 263, 264. This combination occurs at functional block 265, which stores screen overlapping information, and thus generates display screen information at functional block 266.

Means 267 for generating a hard copy is suitable between the functional block 261 and the functional block 267 so that a hard copy can be generated. Thus, as shown in FIG. 26, when a screen copying instruction is given, that instruction may be to copy a screen as actually displayed (display screen) (i.e. the hard copy block 267 as connected to the block 266) or may copy the underlying prepared display (referred to as a basic screen) (i.e. the hard copy block 267 is connected to the block 261). The copy may be of the basic screen or the displayed screen. FIG. 26 also shows a functional block 268 for monitoring the display screen information.

Figure 3:
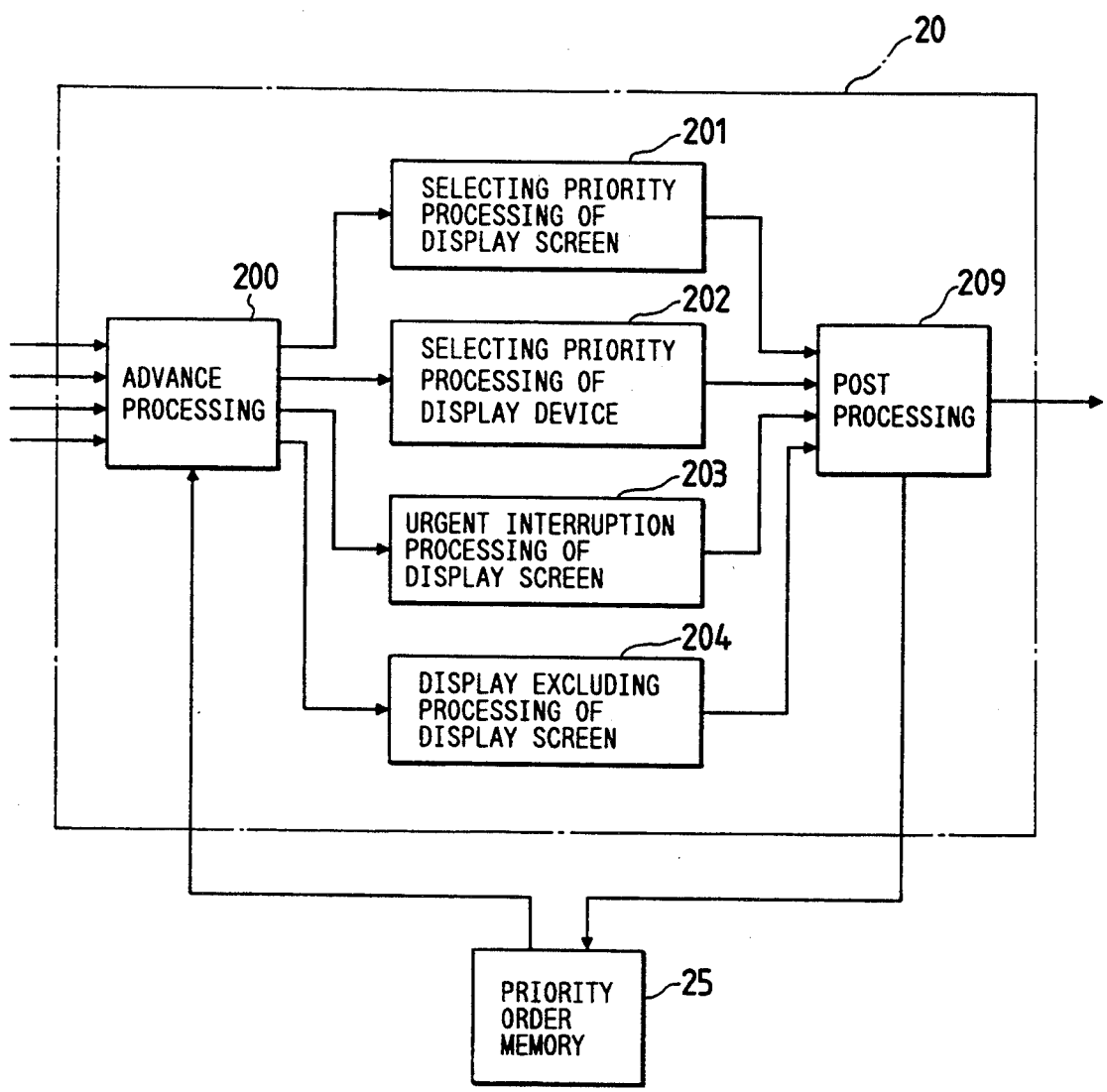
FIG. 3 is a block diagram of one component of the part of the control system shown in FIG. 2.

FIG. 3 is a flow diagram showing the processing of priority requests 20, referred to above. When a plurality of requests are transmitted, the first step is advance processing to confirm acceptance and order the requests, and this is carried out by step 200. Then, a step 201 carries out priority processing to determine which screen to select, and then a step 202 carries out priority processing of the display device on which the screen is to be displayed.

In some cases, it may be necessary to interrupt the display of a screen, e.g. to display another screen, and in this case it is necessary to process a signal requiring urgent interruption of the display screen, which is carried out at step 203. Furthermore, there may also be requests that no screen be displayed, and such display excluding processing is carried out by step 204. The order of these various processes is determined by post processing step 209, and the priority order thus determined is stored in a priority order memory 25. Then, if a screen selected with the highest priority is subsequently deleted, the screen with the next priority can then be selected.

Based on the priority processing discussed above with reference to FIG. 3, the processing of information on a screen to modify that screen will be carried out.

Figure 4:
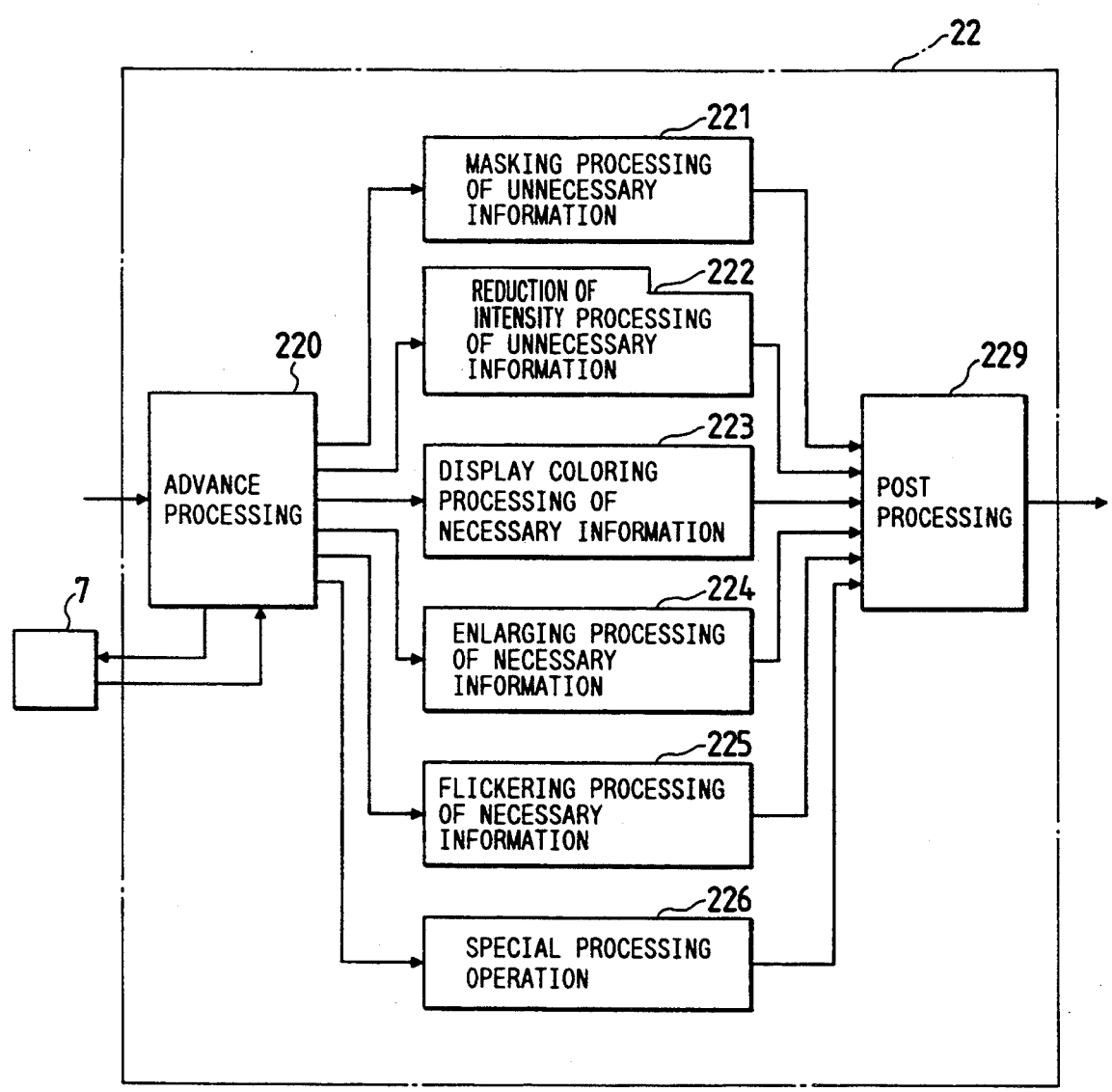
FIG. 4 is a block diagram of another component of the part of the control system shown in FIG. 2.

FIG. 4 shows the processing steps of the processing operation 22 in FIG. 2, namely the processing of fixed form screen information. After advance processing by step 220 of the arithmetic processing 7 referred to with reference to FIG. 1, the following processes are carried out. 1. Masking of unnecessary information. Suppose that there is a screen display of operating situations of plant situations, operating situations of an apparatus, and process conditions such as pressure, temperature, flow rate, etc. Then, suppose that the user inputs a request for a more limited display of information, for example to display only information concerning pressure, or to display only information concerning the parts of the system that are running, and other information is masked by the masking processes 221, and so will not be displayed. To achieve this masking, each screen may be divided up, in advance, into a plurality of areas, and then masking is achievable by either masking or not masking one or more of those areas. Thus, many masking possibilities exist. For example, if there are n masking areas on one screen, $2^n$ screen variations exist.

2. Reducing an intensity of unnecessary information

In the masking process described above, unnecessary information is masked and thereby excluded from the display of the screen. In the reduction of intensity process, shown at step 222, a related operation is carried out in which the unnecessary information is made less prominent on the screen, which thus has the effect of making the desired information more prominent. Reduction of intensity can be achieved by defining areas of the screen in a similar way to that done for the masking operation.

3. Colouring of desired information

The above steps (1) and (2) make unnecessary information less prominent or cancel it totally from the display of the screen. However, it is also possible to make the desired information more prominent, by displaying it in a different colour. This may be carried out at step 223.

4. Enlarging of desired information

It is also possible to change the size of the desired information, at step 224, to make the desired information more prominent.

5. Flickering of desired information

Process step 225 may arrange for desired information to be caused to flicker on the screen, thereby making it more prominent.

6. Other processes

Figure 6:
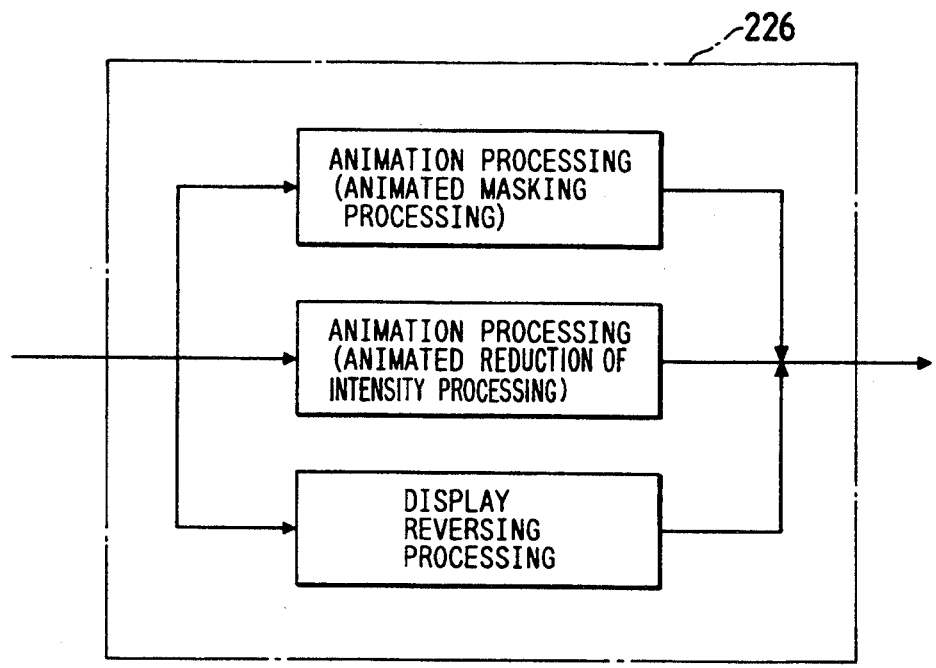
FIG. 6 is a block diagram of part of the component shown in FIG. 4.

There are other operations which may be carried out in the screen, and these are shown in FIG. 4 by step 226, and are illustrated in more detail in FIG. 6. In fact, this step may include one or more of a number of different possibilities such as:

a) animated masking, in which the masking of part of the screen is turned on and off periodically. For example, this is applicable to the display of a start-up operation within a piping system, in which the piping system is divided up into a number of areas, and those areas are alternately masked and un-masked, with this operation being applied in opposite senses to adjacent parts of the piping system.

b) animated reduction of intensity may provide a similar effect to a) above, but for a reduction of intensity process rather than a masking process.

c) display reversing processing, in which the colours of desired information, and the background colour of the screen, are reversed relative to the rest of the screen, thereby increasing the prominence of the desired information. This operation is not confined to reversal of colours, however, and other methods such as decolouring may also be applied.

Any one or more of the operations 221, 222, 223,224,225 and 226 in FIG. 4 may be applied to a screen signal, as requested by a user, and then the outputs of the various processes are combined at a post-processing step 229 to permit the modified screen to be displayed.

Figure 5:
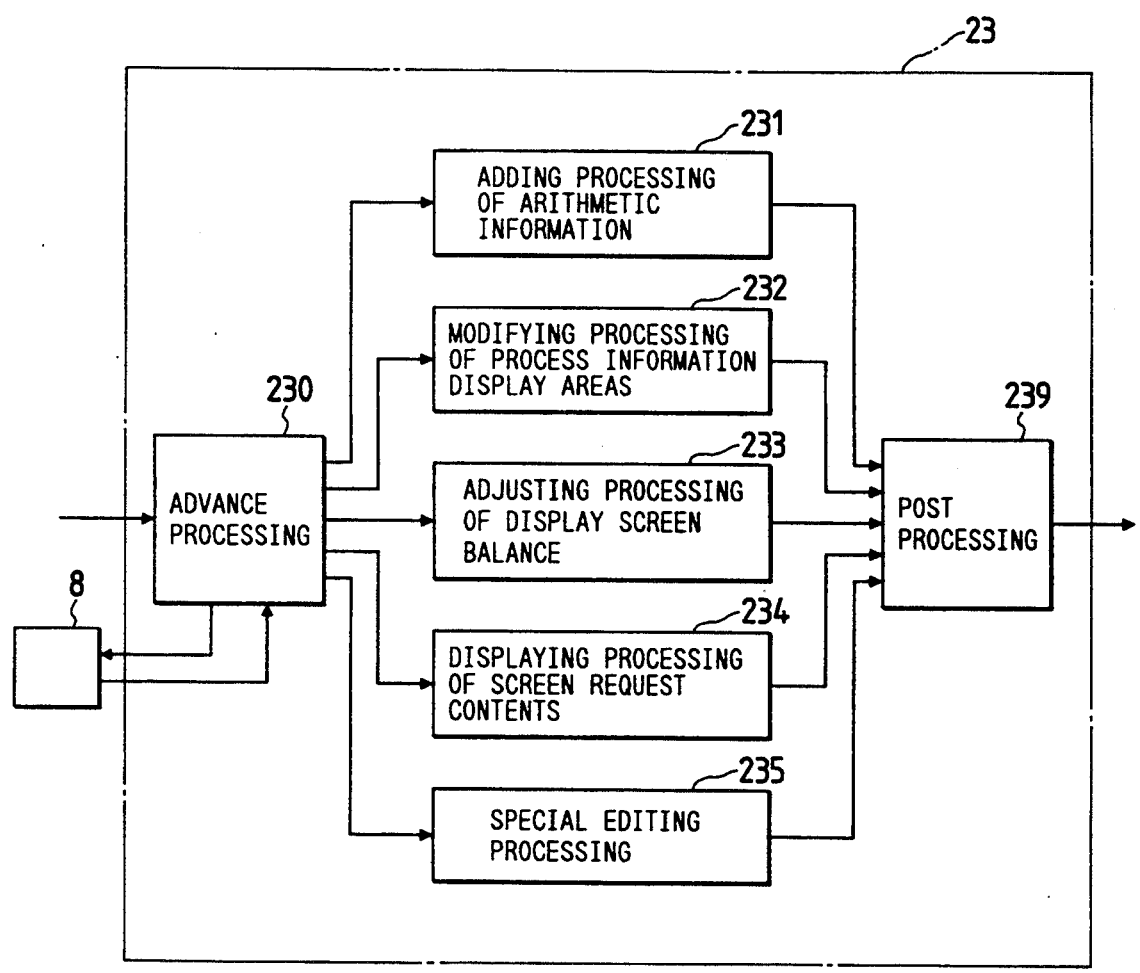
FIG. 5 is a block diagram of a further component of the part of the control system shown in FIG. 2.

FIG. 5 illustrates the operation of screen editing. A screen processed by the operations shown in FIG. 4 is then input into the editing process 23 in FIG. 2, and this is shown in detail in FIG. 5. As shown in FIG. 5, an advance processing step 230 receives the screen information, and then one or more of the following processes may be carried out:

1. Additional processing of arithmetic information.

It may be desired for the screen to display additional information to that supplied, by performing arithmetic operations on the original data. For example, enthalpy may be calculated using pressures and temperatures, rates of change may be calculated from changes in the amounts present, and such calculations may be achieved by an arithmetic processing step 231.

2. Adjustment of display area

Suppose that a screen displays flow rate, pressure, and temperature of a fluid flowing inside the pipe in a display of a piping system. Suppose then that the user desires to exclude from the display both the rate and temperature. Then, only the pressure is displayed and, depending on the masking areas, the display of pressure may be spaced from the display of the pipe to which it relates. Then, there may be some confusion in relating the pressure display to the corresponding pipe part, and therefore a process at step 232 may move the location of the display of the pressure to a point on the screen closer to the corresponding pipe. In order to achieve this, the various information (temperature, pressure, etc.) may be arranged in priority order, with the highest priority corresponding to a position closest to the pipe. Then, if some of the information is masked, information with the next highest priority order is moved to a position closest to the pipe.

3. Screen balance adjustment

When masking is performed to exclude unnecessary information from the screen, the screen may then become unbalanced because the information then displayed is located in only a part of the total screen. Then, a process 233 may be used to adjust the location of the information on the screen, to make the screen well-balanced. This operation is controlled by the knowledge processing function component 8.

4. Display of screen requests

As was mentioned above, the user may request that only some of the information is displayed. Then, it is useful for the screen also to contain an indication of the restricted nature of the display, by saying for example that the screen displays only pressure, only displays enthalpy, etc. This may be achieved by a step 234.

5. Special processing

Figure 7:
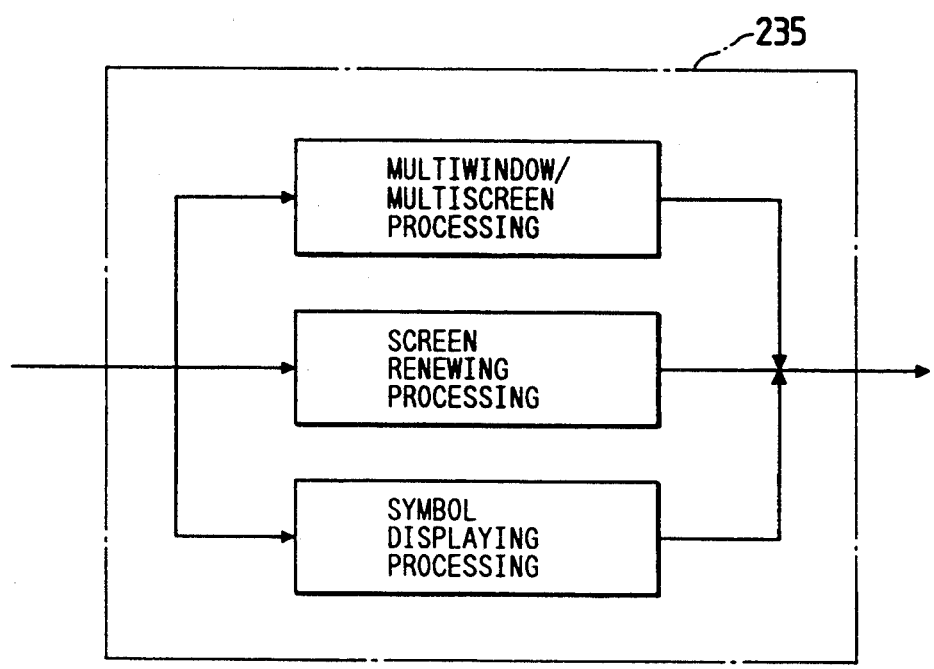
FIG. 7 is a block diagram of part of the component shown in FIG. 5.

There are a number of further operations that may be carried out at a further step 235, and this is illustrated in more detail in FIG. 7. The processes may include:

a) multiwindow/multiscreen processing: this involves the use of a multiwindow function of a display device, so that two screens may be displayed on the display device. Examples of such a multiwindow arrangement may include:

i) if screens are ordered in a priority order, one window may show the screen of highest priority order, and another window may show a screen of the next highest priority order. ii) if a screen which was displayed at a previous time has been overridden, that overridden screen may be shown in a window. For example, when a different screen is automatically displayed, thereby overriding the selection of screen by the user, the window may show the screen that has been overriden. b) Screen renewing: this involves successively operating a screen renewal operation when the screen has been displayed. For example, suppose an instruction is given to delete one screen and replace it by another screen. Then, the processing may arrange for the first screen to seem gradually to disappear from one side, with the next screen gradually seeming to appear from that side. This process also may permit two sorts of screen to be displayed through a synthetic processing. c) Symbol display: it is possible for a symbol, such as a pointing finger or arrow to be displayed on the screen to draw the attention of a user to some specific feature.

Figure 8:
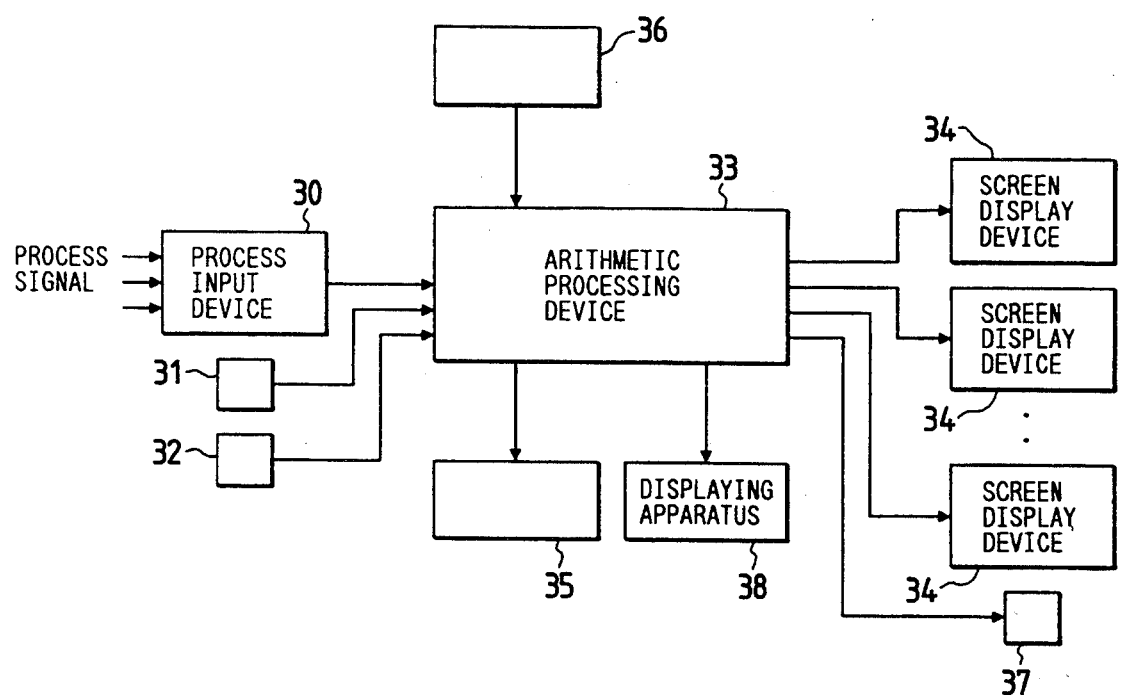
FIG. 8 is a block diagram showing the hardware components of the embodiment shown in FIG. 1.

Using the system described above with reference to FIGS. 1 to 7, the operation of an embodiment of the present invention has been described, and hardware for achieving this is shown in FIG. 8 which shows:

1) a process input device 30: a device for inputting processed information of a plant or an apparatus system.

2) An arithmetic processing device 33: a device for carrying out the processing operations, editing, arithmetic functions, etc., as discussed with reference to FIGS. 1 to 7. This device has the functions of components 2,3,5,7 and 8 in FIG. 1.

3. Operator detecting device 31: this is a device for detecting the existence of an operator and carrying out the function shown by component 9 in FIG. 1.

4) ID card input device 32: this permits ID cards to be input which store information concerning the users of the display device, to enable the display device to adapt to different users. This thus carries out the function of component 10 in FIG. 1.

5) Screen display device 34: this displays processed and edited screens, and may be a CRT (VDU), a large-sized display, or a similar display, and thus carries out the function of component 4 in FIG. 1.

6) Screen copying device 35: this device permits screens to be copied to a hard-copy, and thus carries out the function of component 11 in FIG. 1

7) Operator demand input device 36: this permits the user of the display device to input requests, and thus fulfills the function of component 6 in FIG. 1.

8) Information device 37 and indicator 38: these may inform and indicate automatic screen display in order to attract the attention of a user to a particular screen, and thus carry out the function indicated by component 12 in FIG. 1.

Figure 9:
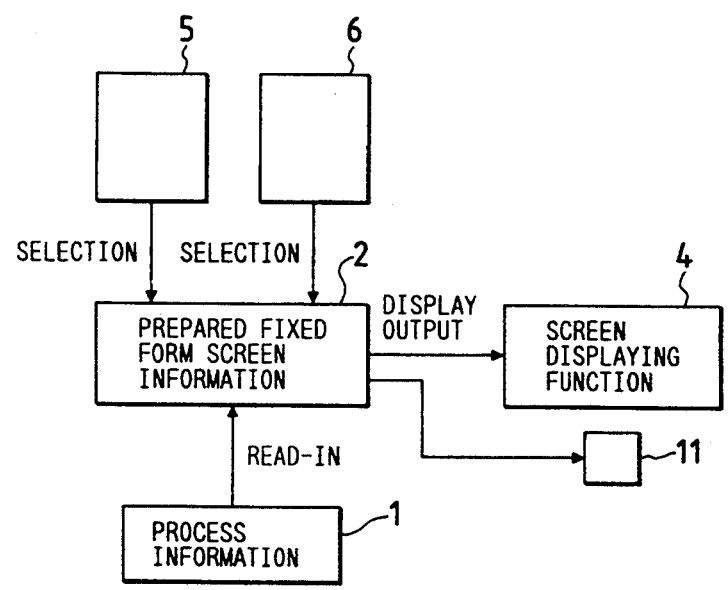
FIG. 9 shows schematically a comparative example of a known control system.

By way of comparison, FIG. 9 shows functions carried out by a known control system. This known control system may be compared to that of the present invention as shown in FIG. 1, and corresponding components are indicated by the same reference numerals. Thus, in the known system, process information 1 is read periodically, and is combined with fixed form screen information 2 prepared in advance. The prepared screen is then displayed on a display device 4. Screens may be selected automatically, particularly if a change is detected in the plant or apparatus being controlled, as shown at component 5, and also screens can be changed in accordance with a request from a user of the display device, shown by component 6. The screen can also be copied using a display screen copying component 11.

Specific examples of screens producible by the present invention will now be described with reference to FIG. 10 to 25.

Figure 10:
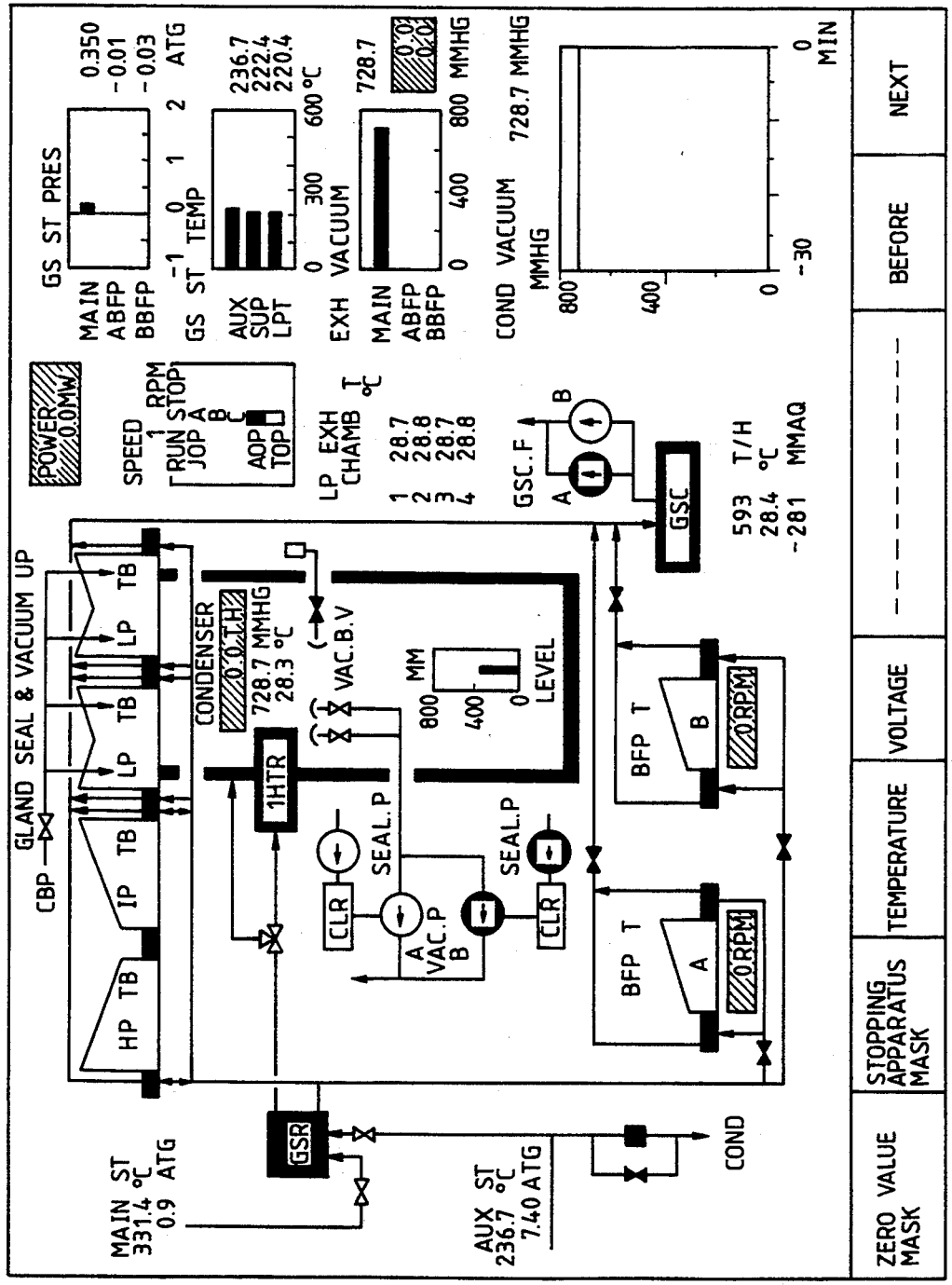
Figure 11:
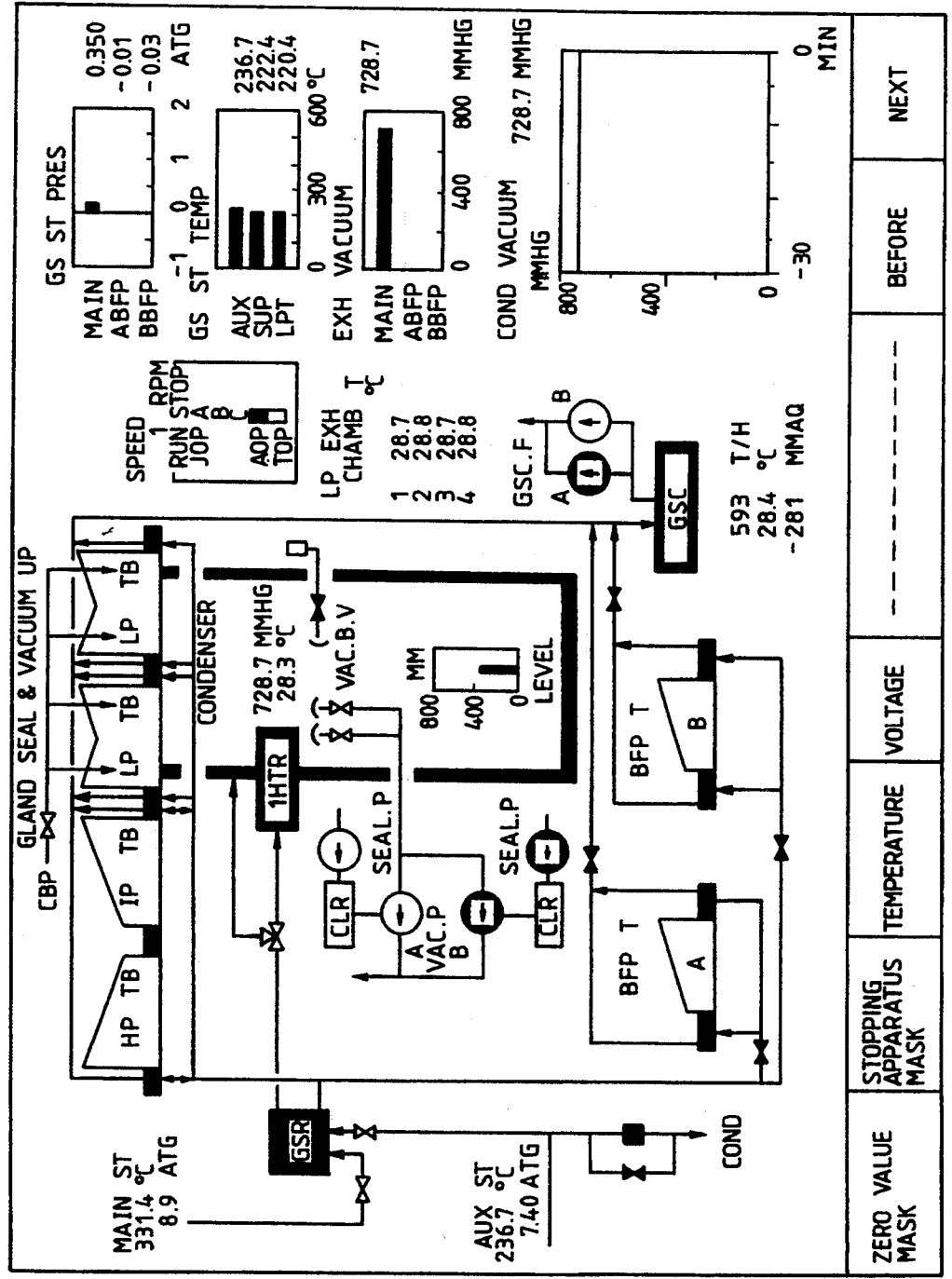

FIG. 10 shows graphically a plant being a piping system, in which various processes are displayed. In FIG. 10, the plant is a steam power plant, and the screen shows a steam turbine gland seal and the vacuum system of the plant. In this screen, there is shown graphically apparatus such as a high pressure turbine (HP TB), a low pressure turbine (LP TB), a vacuum pump (VACP), and piping for steam, water, air etc. The connection of these apparatuses is displayed graphically, and the operational state of these apparatuses is displayed. Also displayed is fluid flowing in the pipes. The existance of fluid flow is displayed by a display with a different colour, and the operational states of the system are displayed digitally. Thus, the operational conditions of the system is displayed to a user of the display device.

As illustrated in FIG. 10, the screen also shows some process conditions displayed by a bar-graph at the right hand side of the screen. Then, the present invention is applied to the screen shown in FIG. 10, to delete the process states with a zero value, since these present no information to the user. Masking is carried out on such information as indicated by diagonal lines in FIG. 10, and the result is the screen shown in FIG. 11.

For example, when an input device such a touch panel is used, a touch area for indicating processing and editing of the display screen may be provided at a particular area of the screen, e.g. the bottom of the screen as shown in FIG. 10. In this case, when it is intended to mask zero values, this may be achieved by touching an area of that touch panel marked "zero value mask" and this causes information with a zero value to be deleted from the screen.

Figure 12:
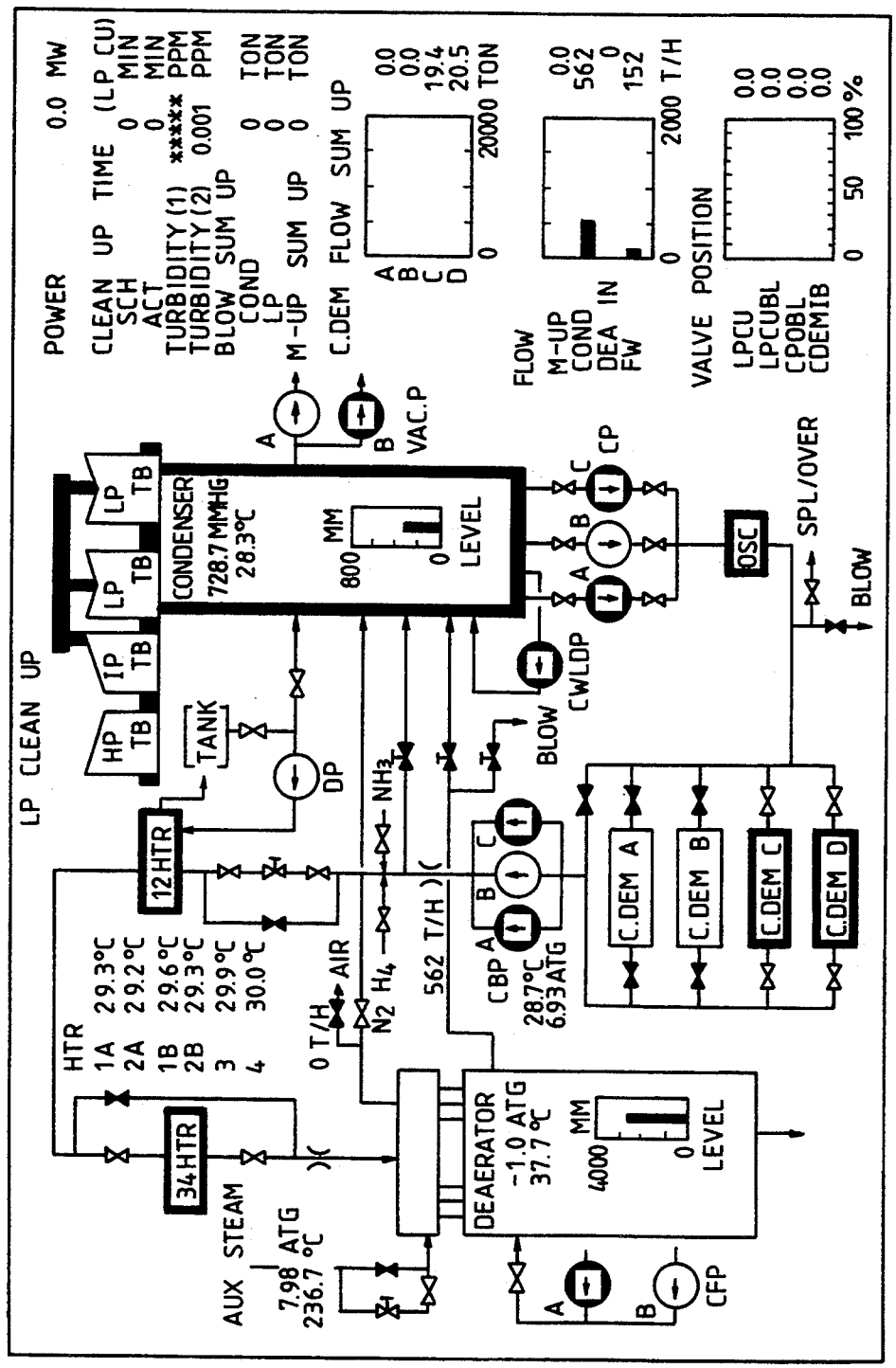
Figure 13:
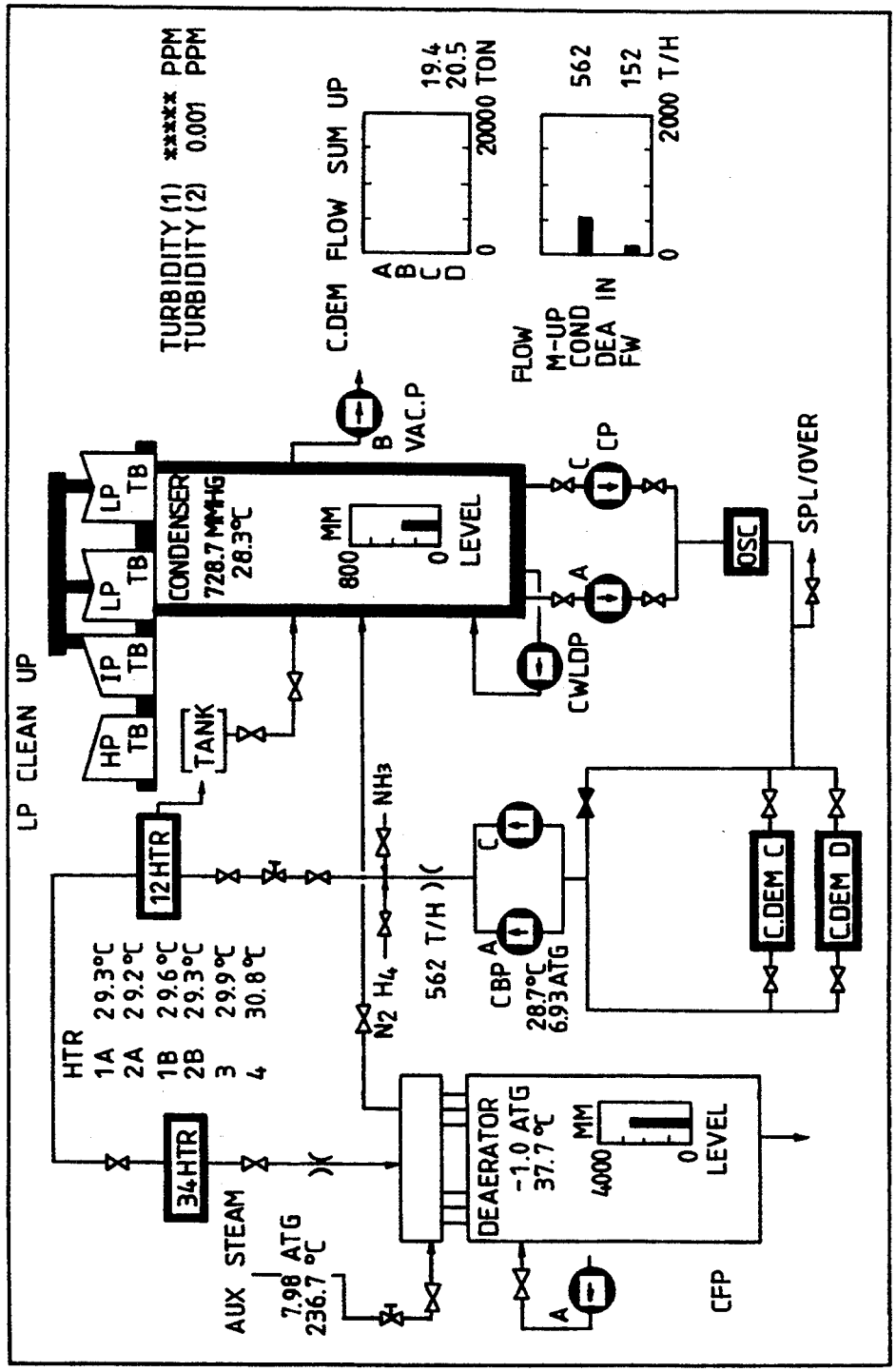

FIG. 12 illustrates a screen corresponding to a low pressure clean-up system. With the screen, if a request is input that information concerning apparatuses which are stopped is deleted from the screen, and only those apparatuses which are working are displayed, the apparatuses which ape not working may be masked, and the result is shown by the screen in FIG. 13. This screen is much more clear.

Figure 14:
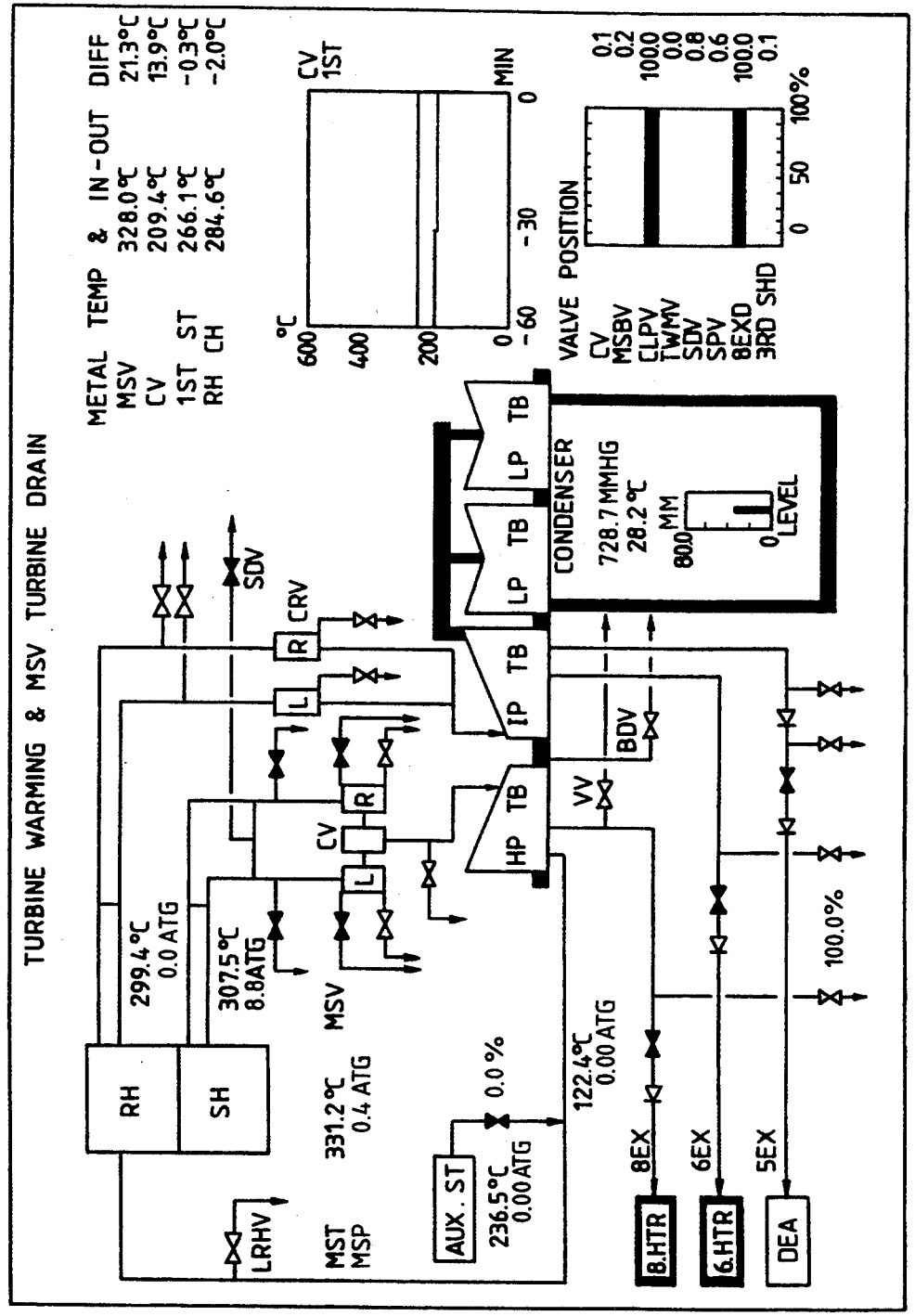
Figure 15:
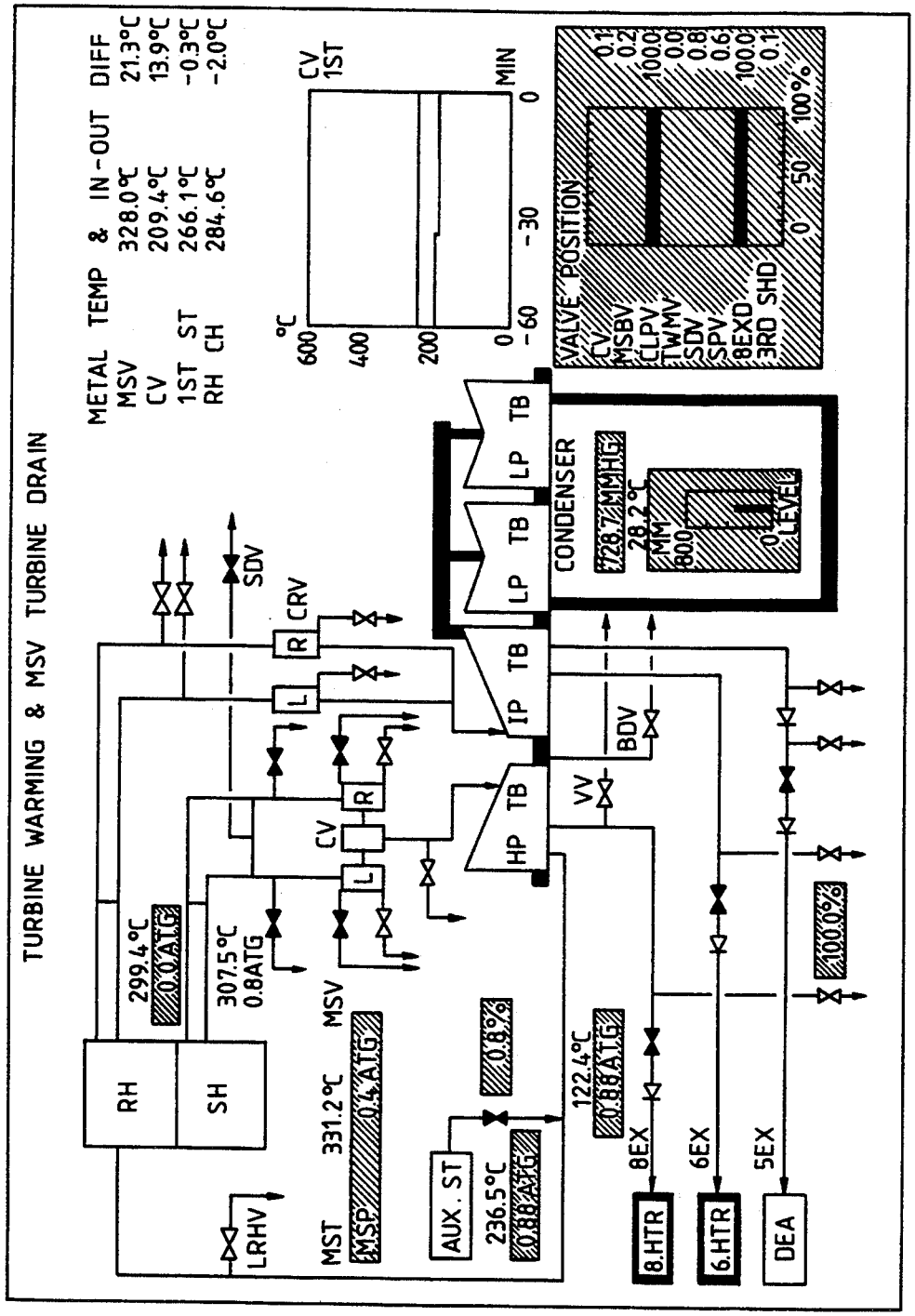
Figure 16:
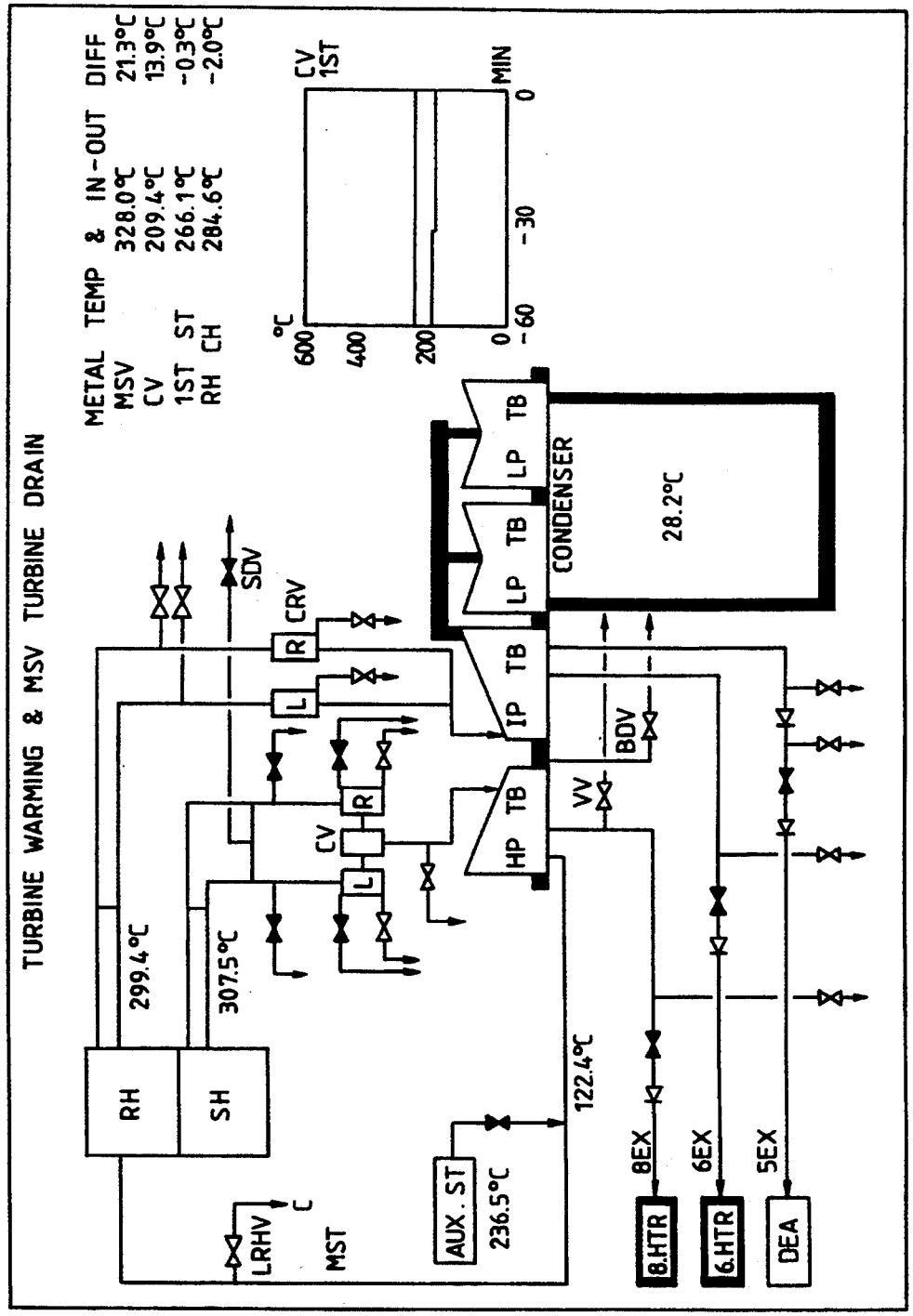

FIG. 14 shows a screen representing a turbine steam/drain piping system. If the user of the display device requests fop this screen to be displayed showing only the temperatures of the various processes being carried out, masking of specific areas shown in FIG. 15 by diagonal lines may occur, and the result is a simplified screen as shown in FIG. 16.

Figure 17:
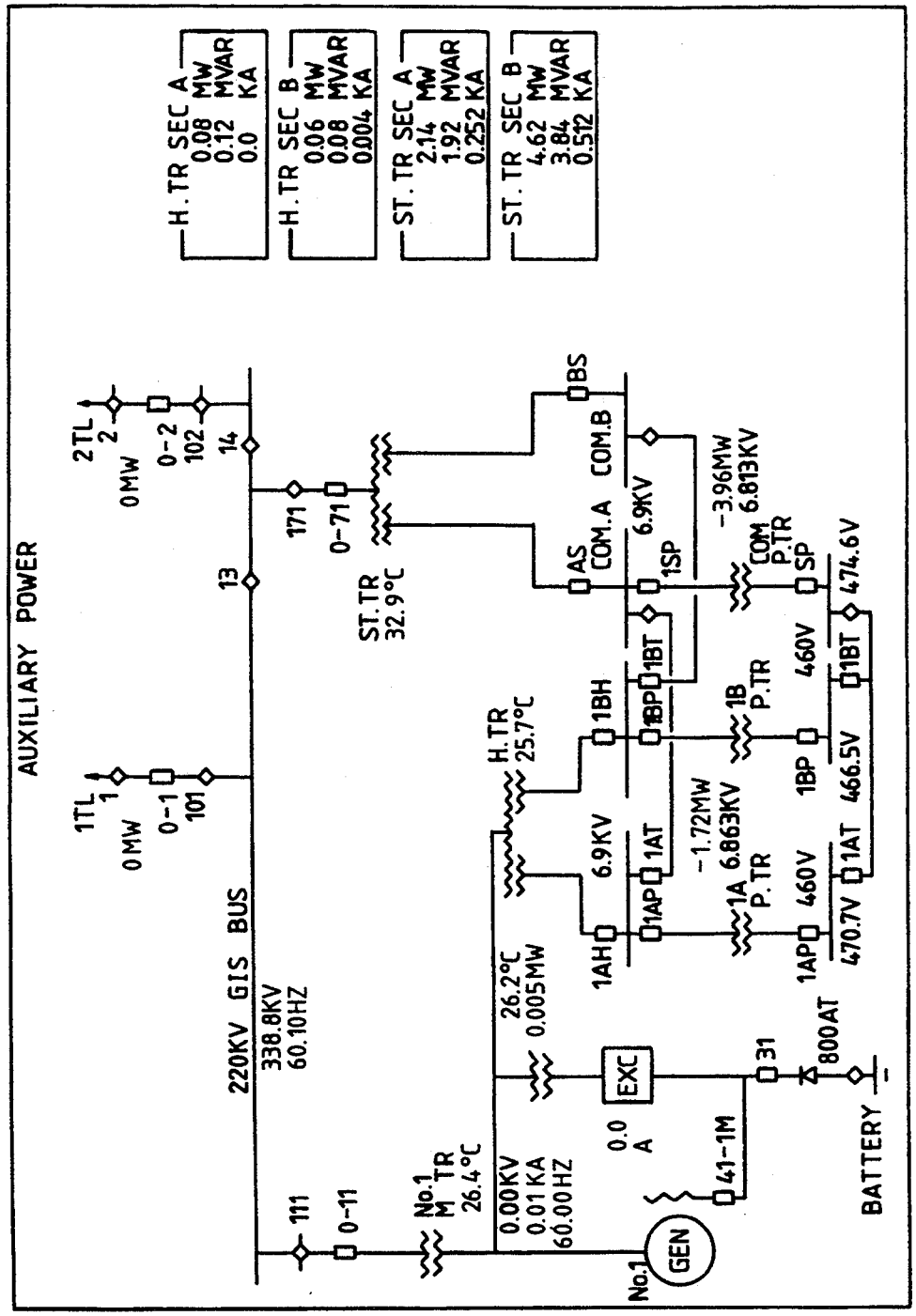
Figure 18:
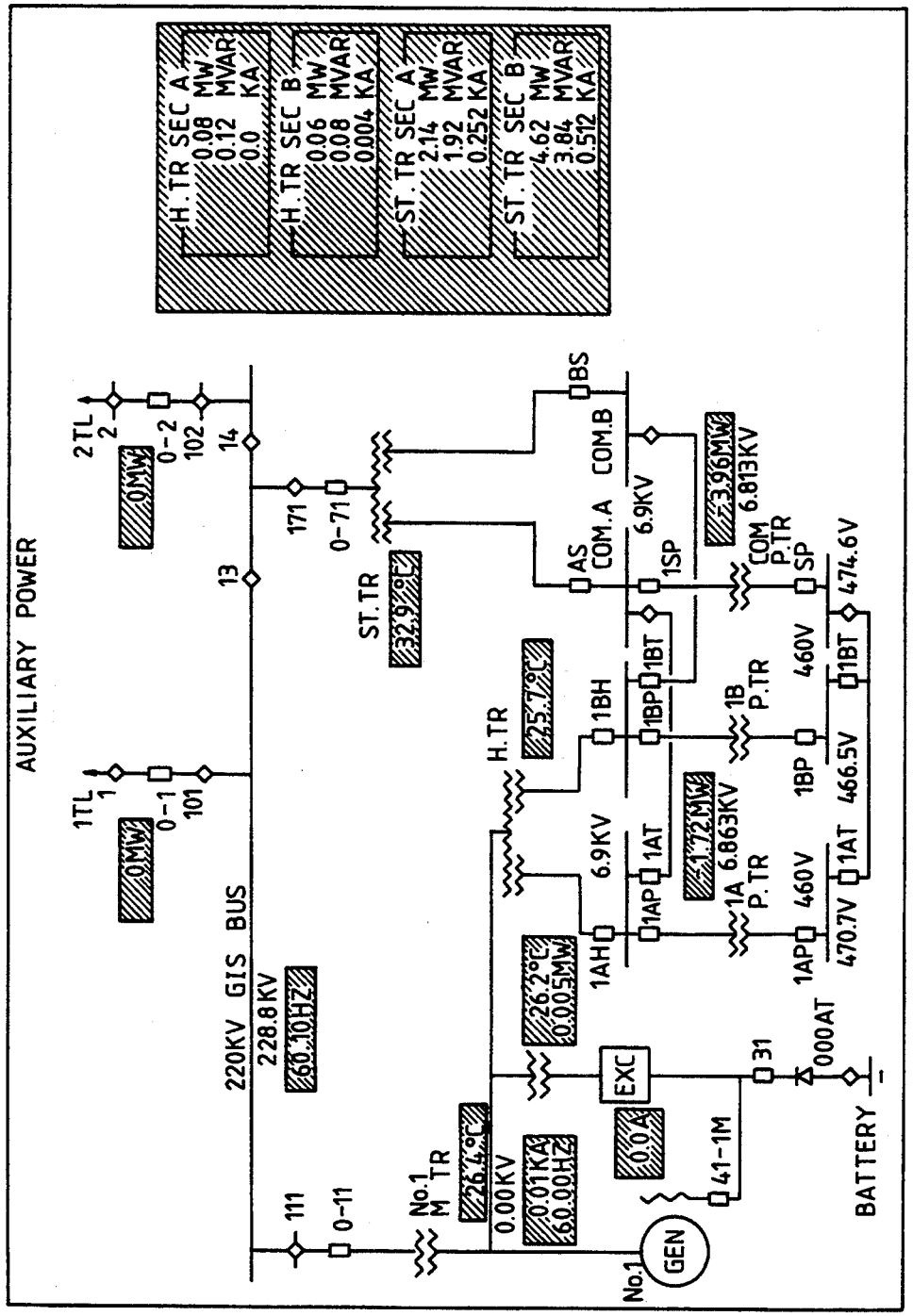

FIG. 17 is a screen showing a power source system. If a user requests that only voltage values of this screen be displayed, areas may be masked as shown by diagonal lines in FIG. 18, thereby simplifying the screen. Those masked parts will be deleted from the final screen in a similar way to that shown in FIG. 16.

FIG. 19 illustrates graphically a specific display method fop adjusting the processes information display area, as referred to above. Information is displayed in a priority order, and when information with a higher priority is considered by the user to be unnecessary, information displayed in the next priority order may be moved upwardly, to display the desired information with highest priority uppermost.

Figure 20:
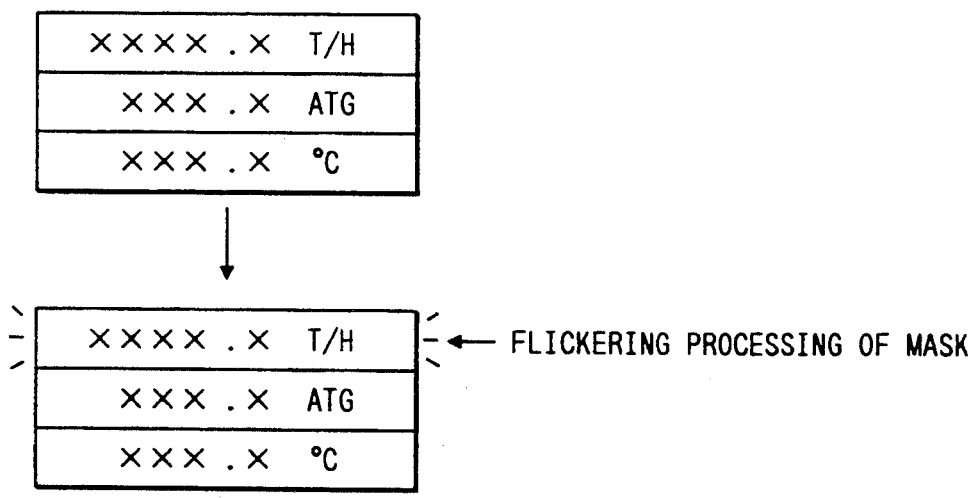
Figure 21:
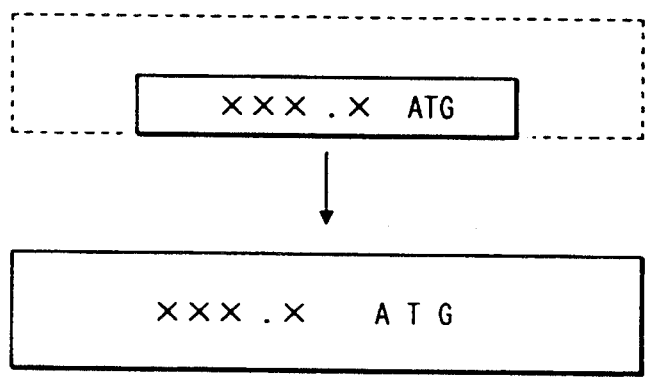

FIG. 20 illustrates in mope detail an example of an animated masking process, discussed above with reference to FIG. 6 in which the attention of the user is attracted by flickering of part or all of the display. In a similar way, FIG. 21 shows a specific example of an enlarging operation. This was referred to above with reference to FIG. 4, and ensures that desired information is enlarged on the display to give it a higher visibility.

Figure 22:
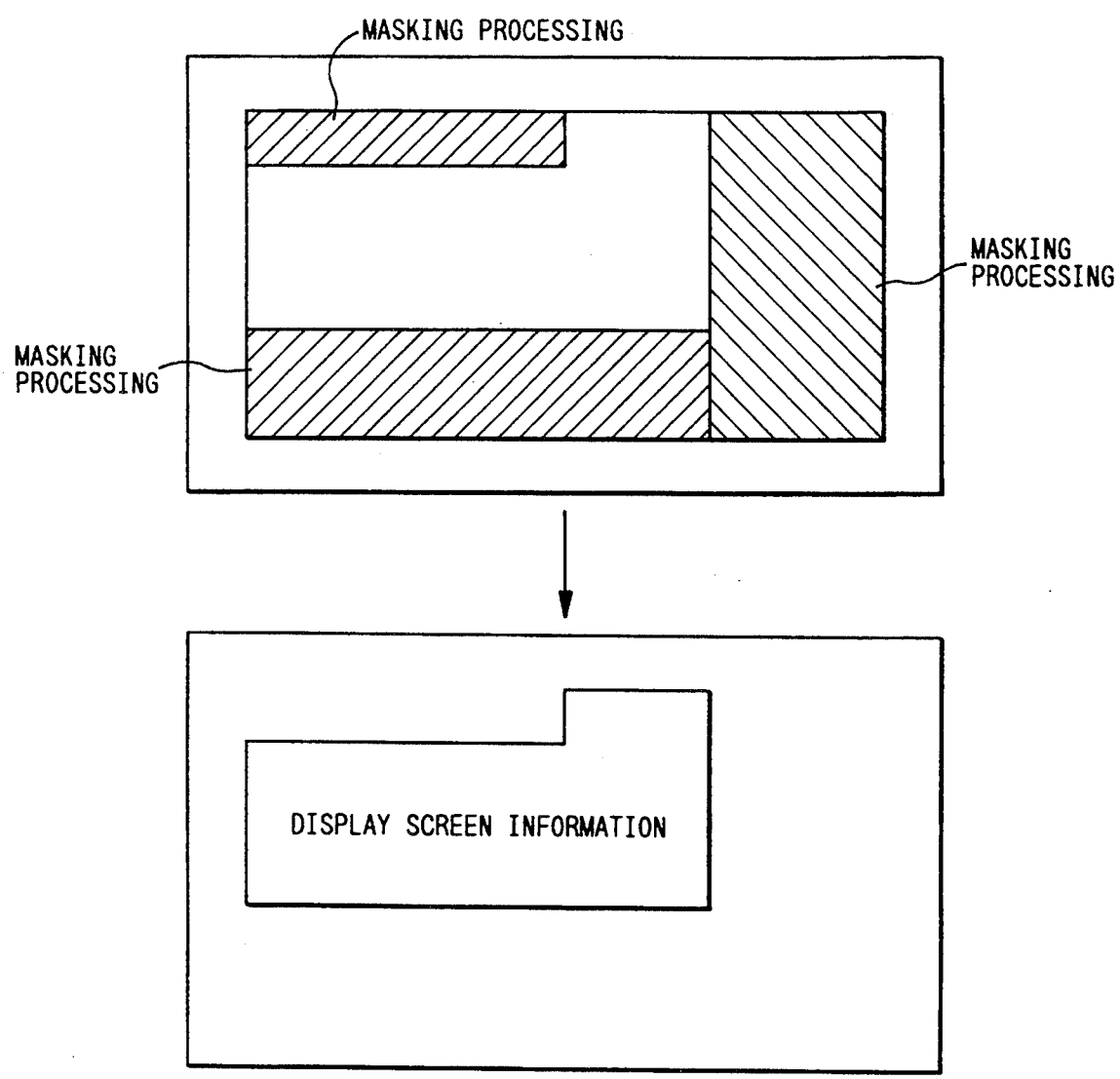

FIGS. 22 to 25 illustrate a specific example of a screen balance adjustment process, referred to above with reference to FIG. 5. In FIG. 22, there is shown the operation of masking part of a screen, to display only the desired information. The result is an unbalanced screen in which information is concentrated at the upper left side of the screen. In order to adjust this inbalance, information relating to the position of the information on the screen must be determined, and this is shown with reference to FIG. 23. Thus, when values $a_1$, $d_1$, determine the position of the information on the screen, areas A, B,C,D, which are hatched in (a) of FIG. 23 should be made as uniform as possible. To do this, the operation shown in (b) of FIG. 23 can be carried out so that the position of the information on the screen may be moved according to those rules. This operation can be carried out by conventional conversion calculations, and the operational speed of this can be improved by use of "Fuzzy reasoning". The result this is shown in (c) of FIG. in which the information is centralised on the screen. It may also be appreciated that the information displayed may then be enlarged to fill the screen, using the enlarging function discussed above.

Figure 24:
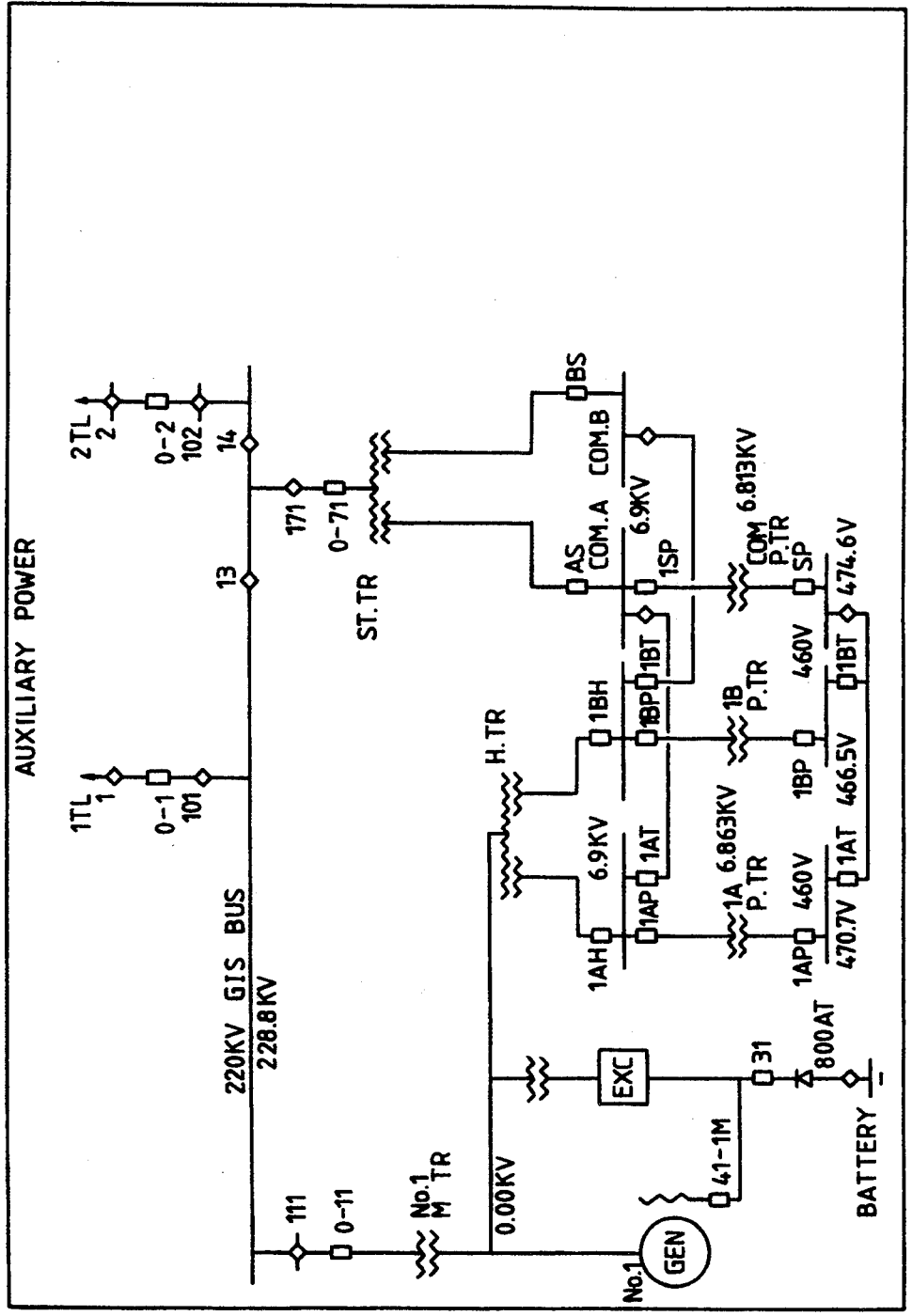
Figure 25:
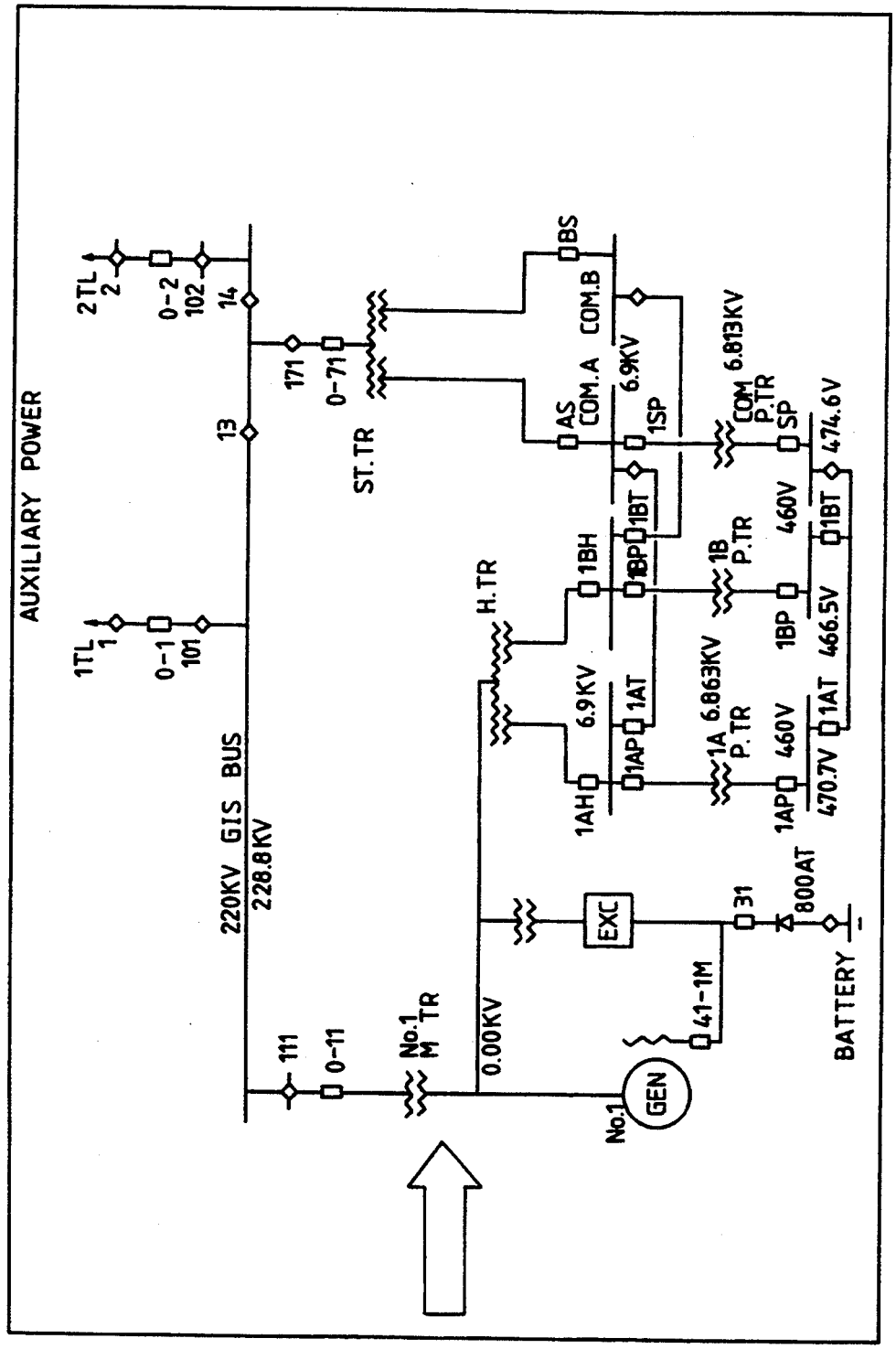

A practical example of this is shown by FIGS. 24 and D, which information is masked on the right hand side of the screen in FIG. 24, and then the information of the screen is shifted as shown in FIG. 2D, so that it is centralised on the screen.

Thus, according to the present invention, fixed form screen information prepared in advance may be processed so that information which does not need to be displayed may be made visually less prominent by operations such as making, and information desired to be displayed may be made more prominent. Furthermore, information may be added to the display and the balance of the screen of the display may be adjusted. Thus, the desired information may be displayed on a display device in a clear way, so that the user of the display device can clearly see genuinely necessary information, without being troubled by excess information, but at the same time without causing problems due to misunderstanding of the display information. The present invention also ensures that unnecessary information is not displayed, so that the user does not need to trouble himself with that unnecessary information.

What is claimed is:

1. A control system for an industrial plant, comprising:
   means for receiving a multiplicity of plant data representing operating parameters of said plant;
   means for storing a plurality of graphical patterns representing said plant;
   means for generating a plurality of prepared displays, each of said prepared displays including at least one of said graphical patterns and at least some of said plant data;
   means for selecting one of said prepared displays;
   means for modifying said selected one of said prepared displays to generate a modified display, said modifying means including means for performing at least one of masking and reducing an intensity of unnecessary information in said selected one of said prepared displays to generate said modified display; and
   means for displaying said modified display.

2. A control system according to claim 1, wherein said means for modifying said selected one of said prepared displays further includes means for performing at least one modification operation selected from the group consisting of translation, change of colour, magnification, and periodic changing of selected information in said selected one of said prepared displays to generate said modified display.

3. A control system according to claim 1, further comprising means for calculating further plant data representing further operating parameters of said plant from said plant data, wherein said modifying means further includes means for incorporating at least some of said further plant data in said selected one of said prepared displays to generate said modified display.

4. A control system according to claim 1, further comprising printing means for providing a hard-copy print of said modified display.

5. A control system according to claim 4, further comprising means for enabling an operator to activate said printing means.

6. A control system according to claim 4, further comprising means for automatically activating said printing means.

7. A control system according to claim 1, further comprising printing means for providing a hard-copy print of said selected one of said prepared displays.

8. A control system according to claim 7, further comprising means for enabling an operator to activate said printing means.

9. A control system according to claim 7, further comprising means for automatically activating said printing means.

10. A control system according to claim 1, further comprising means for inputting information relating to experience and a skill level of an operator, wherein said means for modifying said selected one of said prepared displays further includes means for modifying said selected one of said prepared displays based on said information to generate said modified display, whereby said modified display is at least partially determined by the experience and the skill level of the operator.

11. A control system according to claim 1, further comprising:
    means for selecting a further one of said prepared displays; and
    means for modifying said further one of said prepared displays to generate a further modified display; and
    wherein said means for displaying said modified display includes means for displaying said modified display and said further modified display simultaneously.

12. A control system according to claim 1, further comprising means for receiving a modification request from an operator, wherein said modifying means further includes means for modifying said selected one of said prepared displays in response to said modification request.

13. A control system according to claim 1, wherein said modifying means further includes means for automatically specifying said unnecessary information in said selected one of said prepared displays based on a change in a state of said plant.

14. A control system according to claim 1, wherein said unnecessary information in said selected one of said prepared displays relates to at least one inactive portion of said plant.

15. A control system according to claim 1, further comprising means for detecting whether or not an operator is present, wherein at lest said displaying means does not operate if the detecting means detects that an operator is not present.

16. A control system for an industrial plant, comprising:
    means for generating a plurality of prepared displays, each of said prepared displays including at least one graphical pattern representing said plant and a plurality of plant data representing operating parameters of said plant;

means for selecting one of said prepared displays;
means for selecting only some of said plant data of said selected one of said prepared displays; and
means for displaying said selected one of said prepared displays as a modified display wherein said selected plant data of said selected one of said prepared displays is visually distinguished from other plant data of said selected one of said prepared displays.

17. A control system according to claim 16, wherein said means for selecting only some of said plant data of said selected one of said prepared displays includes means for receiving a request from an operator specifying which of said plant data of said selected one of said prepared displays is to be selected and visually distinguished when said selected one of said prepared displays is displayed by said displaying means as said modified display.

18. A method of operating an industrial plant, comprising the steps of:
receiving a multiplicity of plant data representing operating parameters of said plant;
storing a plurality of graphical patterns representing said plant;
generating a plurality of prepared displays, each of said prepared displays including at least one of said graphical patterns and at least some of said plant data;
selecting one of said prepared displays;
modifying said selected one of said prepared displays to generate a modified display, said modifying step including the step of performing at least one of masking and reducing an intensity of unnecessary information in said selected one of said prepared displays to generate said modified display; and
displaying said modified display.

19. A method according to claim 18, wherein said step of modifying said selected one of said prepared displays further includes the step of performing at least one of translation, change of colour, magnification, and periodically changing selected information in said selected one of said prepared displays to generate said modified display.

20. A method according to claim 18, further comprising the step of calculating further plant data representing further operating parameters of said plant from said plant data, wherein said modifying step further includes the step of incorporating at least some of said further plant data in said selected one of said prepared displays to generate said modified display.

21. A method according to claim 18, further comprising the step of receiving a modification request from an operator, wherein said modifying step further includes the step of modifying said selected one of said prepared displays in response to said modification request.

22. An industrial plant comprising:
a plurality of plant components each having operating parameters;
a control system for monitoring said plant components;
means for detecting said operating parameters of the plant components and converting the detected operating parameters to a multiplicity of plant data; and
means for transmitting said multiplicity of plant data to said control system, wherein said control system monitors said plant components based on said multiplicity of plant data;
wherein said control system includes:
means for receiving said multiplicity of plant data;
means for storing a plurality of graphical patterns representing said plant;
means for generating a plurality of prepared displays, each of said prepared displays including at least one of said graphical patterns and at least some of said plant data;
means for selecting one of said prepared displays;
means for modifying said selected one of said prepared displays to generate a modified display, said modifying means including means for performing at least one of masking and reducing an intensity of unnecessary information in said selected one of said prepared displays to generate said modified display; and
means for displaying said modified display.

23. A control system for an industrial plant, comprising:
means for generating a plurality of prepared displays, each of said prepared displays including at least one graphical pattern representing said plant and a plurality of plant data representing operating parameters of said plant;
means for selecting one of said prepared displays;
means for masking unnecessary information in said selected one of said prepared displays; and
means for displaying said selected one of said prepared displays as a modified display wherein said masked unnecessary information is deleted, thereby enhancing visual clarity of other information of said selected one of said prepared displays in said modified display.

24. A method of operating an industrial plant, comprising the steps of:
generating a plurality displays, each of said prepared displays including at least one graphical pattern representing said plant and a plurality of plant data representing operating parameters of said plant;
selecting one of said prepared displays;
selecting only some of said plant data of said selected one of said prepared displays; and
displaying said selected one of said prepared displays as a modified display wherein said selected plant data of said selected one of said prepared displays is visually distinguished form other plant data of said selected one of said prepared displays.

25. A method according to claim 24, wherein said step of selecting only some of plant data includes the step of receiving a request from an operator specifying which of said plant data of said selected one of said prepared displays is to be selected.

* * * * *